(12) United States Patent
Nakashima et al.

(10) Patent No.: US 11,847,695 B2
(45) Date of Patent: *Dec. 19, 2023

(54) CREDIT SCREENING SUPPORT SYSTEM, VEHICLE-MOUNTED DEVICE, VEHICLE, SERVER, CREDIT SCREENING SUPPORT METHOD, CREDIT SCREENING SUPPORT PROGRAM, AND STORAGE MEDIUM

(71) Applicant: GLOBAL MOBILITY SERVICE INC., Tokyo (JP)

(72) Inventors: Tokushi Nakashima, Tokyo (JP); Satoshi Takahashi, Tokyo (JP)

(73) Assignee: GLOBAL MOBILITY SERVICE INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,338

(22) Filed: Nov. 7, 2022

(65) Prior Publication Data

US 2023/0196454 A1   Jun. 22, 2023

Related U.S. Application Data

(63) Continuation of application No. 17/044,867, filed as application No. PCT/JP2018/014343 on Apr. 3, 2018, now Pat. No. 11,526,937.

(51) Int. Cl.
G06Q 40/02 (2023.01)
G06Q 30/04 (2012.01)
(Continued)

(52) U.S. Cl.
CPC .......... *G06Q 40/03* (2023.01); *B60R 25/045* (2013.01); *B60R 25/24* (2013.01);
(Continued)

(58) Field of Classification Search
CPC ............ G06Q 40/025; G06Q 30/0645; G06Q 2240/00; G07C 5/008
See application file for complete search history.

(56) References Cited

U.S. PATENT DOCUMENTS 8,533,069 B2   9/2013   Sanguinetti
9,544,257 B2   1/2017   Ogundokun et al.
(Continued)

FOREIGN PATENT DOCUMENTS

CN   103874965 A   *   6/2014
CN   105701580      *   6/2016
(Continued)

OTHER PUBLICATIONS

Bozhao Qi, "A vehicle-based Edge Computing Platform for Transit and Human Mobility Analytics", 2017, ACM, pp. 1-14. (Year: 2017).*

(Continued)

*Primary Examiner* — Tan D Nguyen
(74) *Attorney, Agent, or Firm* — HAUPTMAN HAM, LLP

(57) ABSTRACT

Credit information is obtained from an operational status of a vehicle, for example, and a credit limit is increased based on this credit information. A credit screening support system includes a vehicle-mounted device configured to acquire operational information on the vehicle and a server configured to compute the credit information on a user of the vehicle based on the operational information received from the vehicle-mounted device. The server includes an input element for inputting the operational information acquired by the vehicle-mounted device, a credit information computing element for computing credit information on the user based on the operational information input by the input element, and an output element for outputting the credit (Continued)

information on the user computed by the credit information computing element.

20 Claims, 7 Drawing Sheets

(51) Int. Cl.
*G07C 5/00* (2006.01)
*G06Q 40/03* (2023.01)
*B60R 25/045* (2013.01)
*B60R 25/24* (2013.01)
*G06Q 30/0645* (2023.01)

(52) U.S. Cl.
CPC ......... *G06Q 30/0645* (2013.01); *G07C 5/008* (2013.01); *G06Q 2240/00* (2013.01)

(56) References Cited

U.S. PATENT DOCUMENTS

| | | | | |
|---|---|---|---|---|
| 2003/0033231 | A1* | 2/2003 | Turner | G06Q 30/0239 705/36 R |
| 2008/0077541 | A1* | 3/2008 | Scherer | G06Q 30/04 705/400 |
| 2008/0258890 | A1* | 10/2008 | Follmer | G08G 1/052 340/439 |
| 2011/0307141 | A1* | 12/2011 | Westerlage | G07C 5/008 701/31.4 |
| 2015/0026039 | A1* | 1/2015 | Annappindi | G06Q 40/08 705/38 |
| 2016/0328738 | A1* | 11/2016 | Liu | G06Q 30/0242 |
| 2017/0109704 | A1* | 4/2017 | Lettieri | G06Q 10/1093 |
| 2017/0178245 | A1* | 6/2017 | Rodkey | G06Q 30/0202 |
| 2019/0024035 | A1* | 1/2019 | Yau | C12M 23/20 |
| 2019/0095898 | A1 | 3/2019 | Bhatia | |
| 2021/0024035 | A1 | 1/2021 | Nakashima et al. | |
| 2021/0237683 | A1 | 8/2021 | Nakashima et al. | |

FOREIGN PATENT DOCUMENTS

| | | | | |
|---|---|---|---|---|
| CN | 105701580 | A | | 6/2016 |
| CN | 106096657 | * | | 11/2016 |
| CN | 106096657 | A | | 11/2016 |
| CN | 107066558 | A | * | 8/2017 ......... G06F 16/9535 |
| CN | 107463997 | A | * | 12/2017 |
| CN | 107463997 | A | | 12/2017 |
| CN | 107516183 | A | | 12/2017 |
| JP | S63163567 | A | | 7/1988 |
| JP | 2010186319 | A | | 8/2010 |
| JP | 2010257029 | A | | 11/2010 |
| JP | 201485758 | A | | 5/2014 |
| JP | 2015135631 | A | | 7/2015 |
| WO | 2016000501 | A1 | | 1/2016 |

OTHER PUBLICATIONS

Mitch Bryson, "Vehicle Model Aided Inertial Navigation for a UAV using Low-cost Sensors," 2006, University of Sydney, pp. 1-9. (Year: 2006).*
Jean Kumagai, "Sensors & Sensibility," 2004, Sensor Nation Society, IEEE Spectrum, Jul. 2004, pp. 1-7. (Year: 2004).*
Google Scholar Search Feb. 13, 2021. (Year:2021).
International Search Report in PCT/JP2018/014343, dated May 29, 2018. 3pp.
IP, IQ.com Search Feb. 13, 2021. (Year 2021).
Keramati, abbas "Developing a Prediction Model for Customer Churn From Electronic Banking services using Data Mining", 2016, Finacial Innovation, pp. 1-14, 2016.
Qi, Bozhao, "A Vehicle-based Edge Computing Platform for Transit and Human Mobility Analytics", Oct. 12-14, 2017, In Proceedings of SEC 17, San Jose, CA USA, 14 pages. (Year:2017).
E. Mnkandla, "A Survey of Agile Methodologies", Dec. 2004, The Transactions of the SA IOEE, pp. 236-247. (Year: 2004).

* cited by examiner

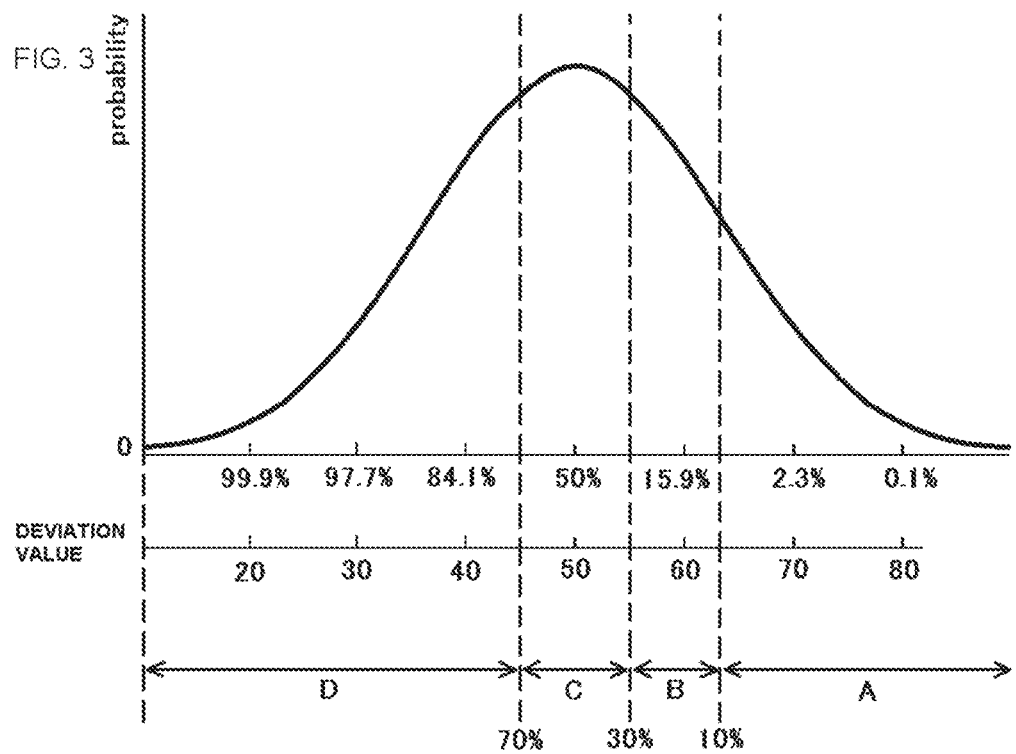
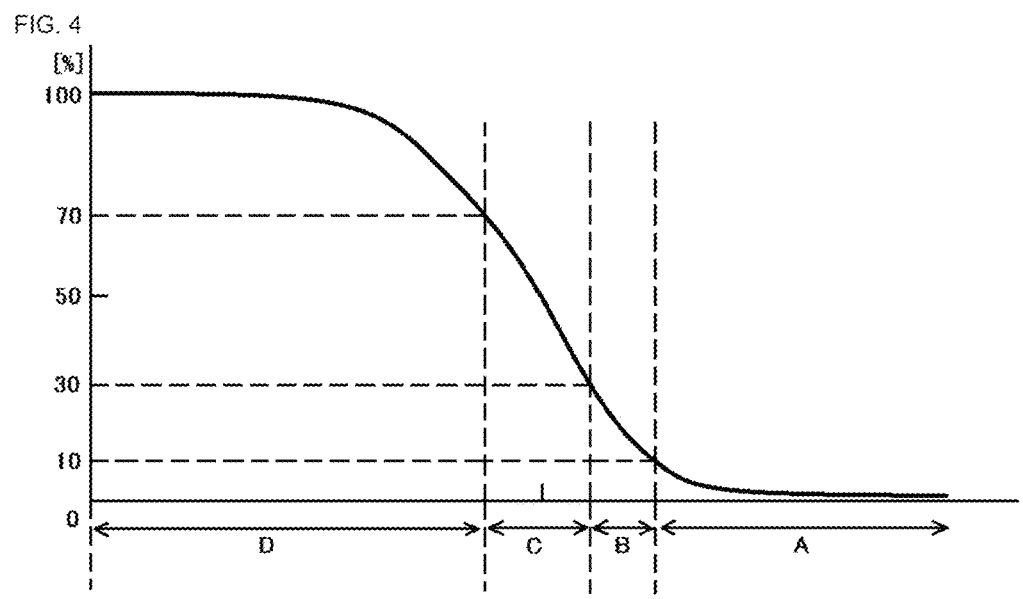

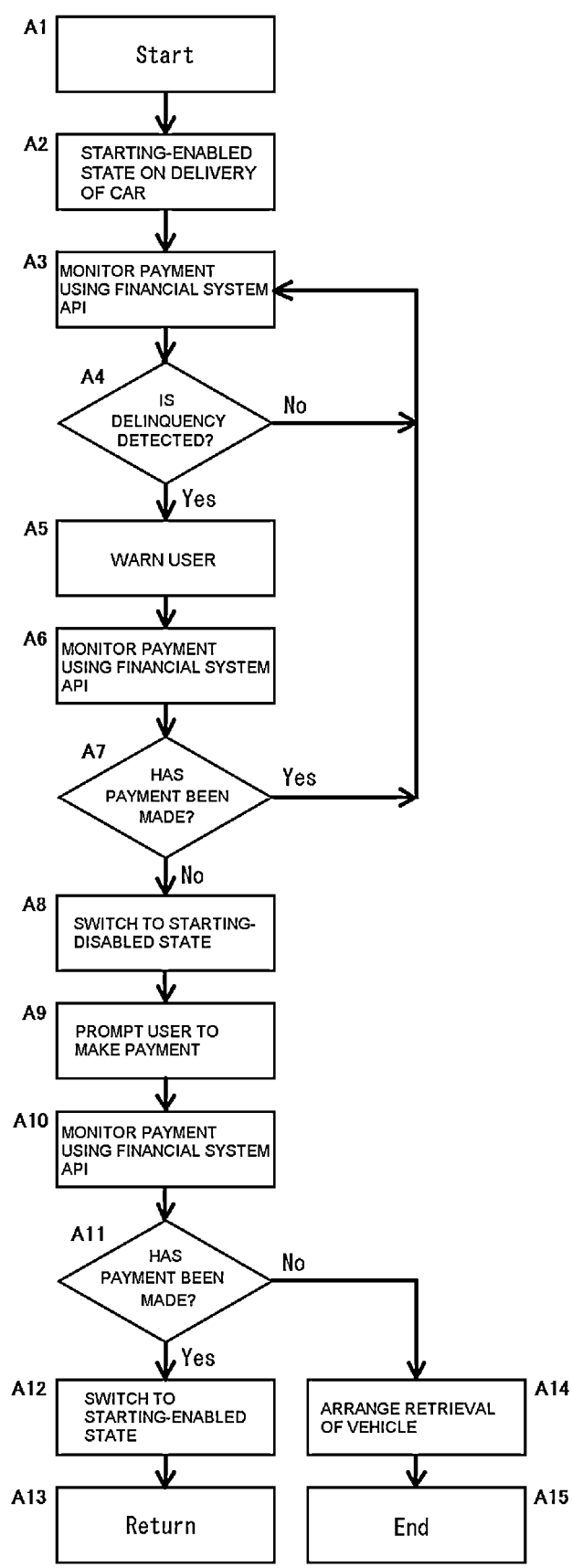

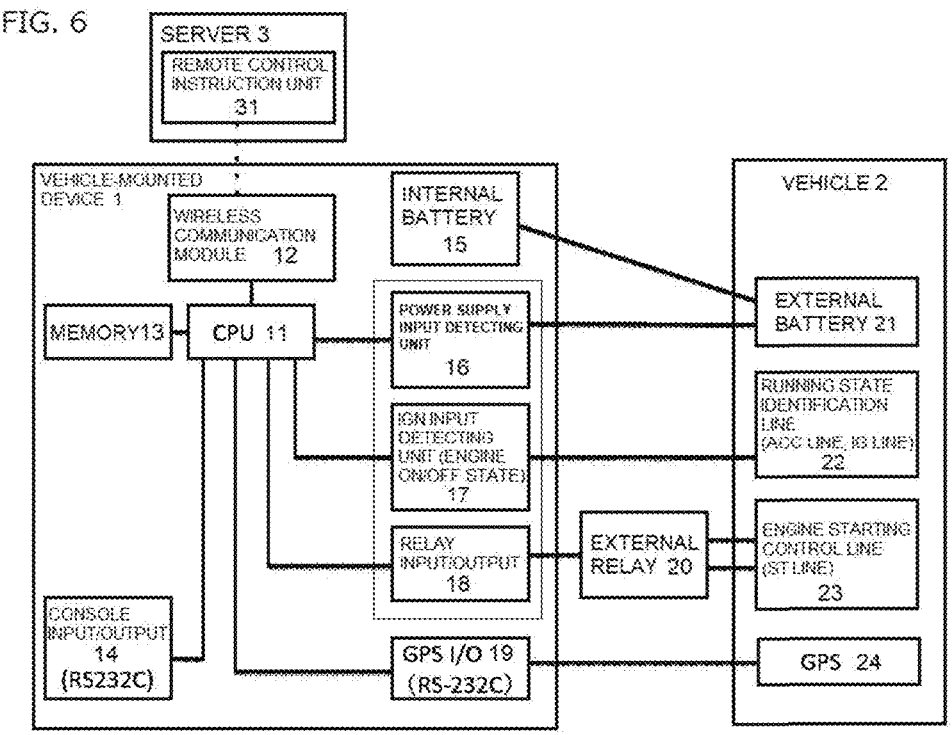

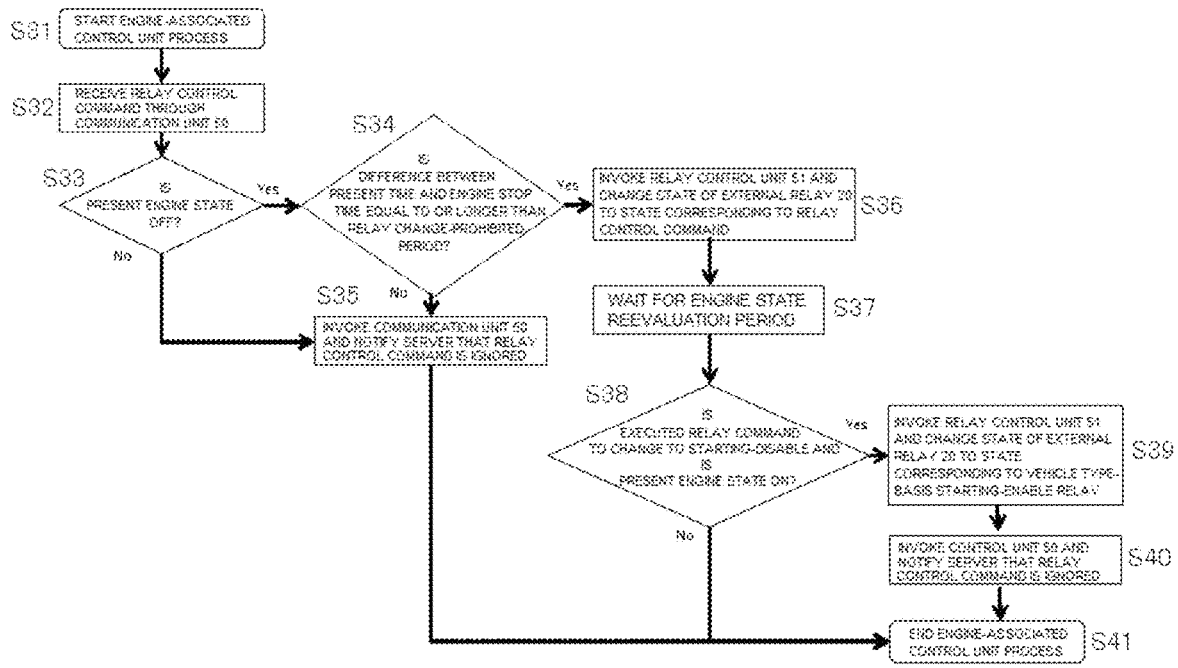

CREDIT SCREENING SUPPORT SYSTEM, VEHICLE-MOUNTED DEVICE, VEHICLE, SERVER, CREDIT SCREENING SUPPORT METHOD, CREDIT SCREENING SUPPORT PROGRAM, AND STORAGE MEDIUM

RELATED APPLICATIONS

The present application is a continuation application of U.S. application Ser. No. 17/044,867, filed Oct. 2, 2020, which is a National Phase of International Application Number PCT/JP2018/014343, filed Apr. 3, 2018, the disclosures of which are hereby incorporated by reference herein in their entireties.

FIELD

The present invention relates to a credit screening support system applied to a vehicle equipped with a vehicle-mounted device, a vehicle-mounted device, a vehicle, a server, a credit screening support method, a credit screening support program, and a storage medium.

BACKGROUND

In the field of automobile sales and automobile leasing, people are generally unable to make a loan or a lease contract without passing a finance credit screening, and as a result are unable to obtain a vehicle. Conventional credit screening is based on past credit information, past debt status, and past financial status. Patent Literatures below disclose systems as approaches for improving this credit screening.

Patent Literature 1 discloses a system that sets a break-even point at the intersection of a car market value graph line and a car asset value graph line, where the amount of money is plotted on the vertical axis and a lease term is plotted on the horizontal axis, and calculates the cumulative lease fee at the break-even point as the credit amount, whereby the credit screening criterion can be lowered compared with when the cumulative lease fee on expiration of a lease is regarded as the credit amount.

Patent Literature 2 discloses a support system that facilitates a speedy credit screening, in which credit information reference means estimates that a user is not a multiple debtor, estimate information comparison means compares first lease fee estimate information that is estimate information by a lease company with second lease fee estimate information calculated based on leased vehicle information and determines whether there is a significant difference between them, age value information comparison means compares information about a value in a lease term of the leased vehicle with the first lease fee estimate information and determines whether there is a significant difference between them, remaining value information comparison means compares information about a value of the leased vehicle in the current market with remaining value information transmitted by remaining value information transmission means of a lease company terminal and determines whether there is a significant difference between them, and then guarantee determination result notification means gives notification as to whether to offer a guarantee.

Patent Literature 3 discloses an ETC card credit determination system, in which a set of tollbooth ID and vehicle-mounted device ID is read from history information stored in a usage history storage unit of an ETC card. If the vehicle-mounted device ID in the usage history matches its own vehicle-mounted device ID, it is determined that the possibility of misuse is low, and the level is incremented by four. If the tollbooth ID in the usage history matches the tollbooth ID transmitted from a road-side device this time, it is determined that the possibility of misuse is low, and the level is raised. In addition, card history is read from a vehicle-mounted device ID/card history storage unit, and if the card history includes the one that matches the ETC card attached this time, it is determined that the possibility of misuse is low, and the level is incremented by one. The higher the level the ETC card has, the lower the possibility of being registered in a blacklist of suspected theft and misuse and thus a lower priority is given in credit determination.

CITATION LIST

Patent Literature

Patent Literature 1: Japanese Patent Application Laid-open No. 2015-135631
Patent Literature 2: Japanese Patent Application Laid-open No. 2010-257029
Patent Literature 3: Japanese Patent Application Laid-open No. 2010-186319

SUMMARY

Technical Problem

The system in Patent Literature 1 calculates the cumulative lease fee at the break-even point as a credit amount, thereby lowering the credit screening criterion compared with when the cumulative lease fee on expiration of a lease is regarded as the credit amount. However, the system requires another means to determine the credibility of a lease applicant and does not provide means for allowing those who have the ability to pay at present or in the future to pass a credit screening.

The system in Patent Literature 2 is a support system that is aimed to facilitate a speedy credit screening. However, the assessment by the credit information reference means is similar to conventional credit screening, and those who have the ability to pay at present or in the future undergo a strict assessment and do not pass the credit screening.

The system in Patent Literature 3 determines the possibility of being registered in a blacklist of suspected theft and misuse, based on the usage history information in the ETC card, and decides the priority in credit determination. However, the credit determination is similar to conventional credit screening, and those who have the ability to pay at present or in the future undergo a strict assessment and do not pass the credit screening.

In view of these conventional problems, an object of the subject application is to provide a credit screening support system that can obtain credit information from the operational status of vehicles and increase a credit limit for loan or lease applicants based on the credit information, a vehicle-mounted device, a vehicle, a server, a credit screening support method, a credit screening support program, and a storage medium.

Solution to Problem

The object of the present invention can be achieved by the following configuration. More specifically, a credit screening support system according to a first aspect of the present invention includes:

a vehicle-mounted device configured to acquire operational information on a vehicle; and a server configured to compute credit information on a user of the vehicle based on the operational information received from the vehicle-mounted device.

The server includes input means for inputting the operational information acquired by the vehicle-mounted device, credit information computing means for computing the credit information on the user based on the operational information input by the input means, and output means for outputting the credit information on the user computed by the credit information computing means.

The credit information includes rank information about a credit limit, and the rank information is classified in accordance with the operational information for a plurality of vehicles and/or information computed from the operational information.

According to a second aspect of the present invention, in the credit screening support system of the first aspect, the server further includes income predicting means for predicting income information on the user from the operational information input by the input means. The credit information computing means computes the credit information on the user in accordance with the income information predicted by the income predicting means.

According to a third aspect of the present invention, in the credit screening support system of the first or second aspect, the output means outputs the credit information on the user to a financial system.

According to a fourth aspect of the present invention, in the credit screening support system of any one of the first to third aspect, the rank information is classified into a plurality of stages for each category of users.

According to a fifth aspect of the present invention, in the credit screening support system of any one of the first to fourth aspects, the operational information includes information about at least one of an operational status of the vehicle, a usage status of the vehicle for commuting, an operational status of the vehicle in a case where the vehicle is a taxi, an operational status of the vehicle in a case where the vehicle is a vehicle for business use, an operational status of the vehicle in a case where the vehicle is a vehicle for transportation, and an operational status of the vehicle in a case where the vehicle is a construction machine.

According to a sixth aspect of the present invention, in the credit screening support system of any one of the first to fifth aspects, the server grasps a payment status for the vehicle and transmits a control command for switching between a starting-disabled state and a starting-enabled state of the vehicle in accordance with the payment status to the vehicle-mounted device. The vehicle-mounted device switches the vehicle between a starting-disabled state and a starting-enabled state in accordance with the control command.

A vehicle-mounted device according to a seventh aspect of the present invention is configured to acquire operational information on a vehicle and transmit the operational information to a server configured to compute credit information on a user of the vehicle.

The server includes input means for inputting the operational information acquired by the vehicle-mounted device, credit information computing means for computing the credit information on the user based on the operational information input by the input means, and output means for outputting the credit information on the user computed by the credit information computing means.

The credit information includes rank information about a credit limit, and the rank information is classified in accordance with the operational information for a plurality of vehicles and/or information computed from the operational information.

According to an eighth aspect of the present invention, in the vehicle-mounted device of the seventh aspect, the server grasps a payment status for the vehicle and transmits a control command for switching between a starting-disabled state and a starting-enabled state of the vehicle in accordance with the payment status to the vehicle-mounted device. The vehicle-mounted device switches the vehicle between a starting-disabled state and a starting-enabled state in accordance with the control command.

A vehicle according to a ninth aspect of the present invention includes the vehicle-mounted device of the seventh or eighth aspect.

A server according to a tenth aspect of the present invention is configured to compute credit information on a user of a vehicle based on operational information received from a vehicle-mounted device configured to acquire the operational information on the vehicle.

The server includes input means for inputting the operational information acquired by the vehicle-mounted device, credit information computing means for computing the credit information based on the operational information input by the input means, and output means for outputting the credit information computed by the credit information computing means.

The credit information includes rank information about a credit limit, and the rank information is classified in accordance with the operational information for a plurality of vehicles and/or information computed from the operational information.

A credit screening support method according to an eleventh aspect of the present invention computes credit information on a user of a vehicle based on operational information received from a vehicle-mounted device configured to acquire the operational information on the vehicle.

The credit screening support method includes input means for inputting the operational information acquired by the vehicle-mounted device, credit information computing means for computing the credit information on the user based on the operational information input by the input means, and output means for outputting the credit information on the user computed by the credit information computing means.

The credit information includes rank information about a credit limit, and the rank information is classified in accordance with the operational information for a plurality of vehicles and/or information computed from the operational information.

A credit screening support program according to a twelfth aspect of the present invention is capable of executing the credit screening support method of the eleventh aspect.

A storage medium according to a thirteenth aspect of the present invention stores therein the credit screening support program of the twelfth aspect.

Advantageous Effects of Invention

The credit screening support system according to the first aspect of the present invention can obtain credit information, for example, from an operational status of a vehicle and increase a credit limit based on this credit information. This configuration can solve the problem that those who have the ability to pay at present or in the future undergo a strict screening and fail to pass the credit screening. In addition, rank information about the credit limit can be obtained, for example, from the operational status of the vehicle, thereby facilitating determination of a credit limit. Furthermore, rank information is classified in accordance with the operational information for a plurality of vehicles and/or the income information, whereby a credit limit can be determined appropriately.

The credit screening support system according to the second aspect of the present invention can predict the income of a user, for example, from the operational status of the vehicle.

The credit screening support system according to the third aspect of the present invention can increase the credit limit of the user in accordance with the predicted income of the user, using the credit information obtained from the operational status of the vehicle in the financial system.

The credit screening support system according to the fourth aspect of the present invention obtains rank information in accordance with the user's category and therefore can determine the credit limit appropriately in accordance with, for example, the business type of the user.

The credit screening support system according to the fifth aspect of the present invention can determine the credit limit appropriately in accordance with the operational status of various vehicles.

In the credit screening support system according to the sixth aspect of the present invention, the vehicle-mounted device can switch the vehicle between a starting-disabled state and a starting-enabled state in accordance with the payment status. The vehicle therefore can be set to the starting-disabled state in the event of a delinquency, or the vehicle can be set to the starting state when a predetermined payment is made. This configuration prompts the user to make an appropriate payment.

The vehicle-mounted device according to the seventh aspect of the present invention can obtain credit information, for example, from the operational status of the vehicle and increase the credit limit based on this credit information. This configuration can solve the problem that those who have the ability to pay at present or in the future undergo a strict screening and fail to pass the credit screening. In addition, rank information about the credit limit can be obtained, for example, from the operational status of the vehicle, thereby facilitating determination of the credit limit. Furthermore, the rank information is classified in accordance with the operational information for a plurality of vehicles and/or the income information, whereby the credit limit can be determined appropriately.

In the vehicle-mounted device according to the eighth aspect of the present invention, the vehicle-mounted device can switch the vehicle between a starting-disabled state and a starting-enabled state in accordance with the payment status. The vehicle therefore can be set to the starting-disabled state in the event of a delinquency, or the vehicle can be set to the starting state when a predetermined payment is made. This configuration prompts the user to make an appropriate payment.

The vehicle according to the ninth aspect of the present invention achieves the effect similar to that of the vehicle-mounted device of the seventh or eighth aspect.

The server according to the tenth aspect of the present invention can obtain the credit information, for example, from the operational status of the vehicle and can increase the credit limit based on this credit information. This configuration can solve the problem that those who have the ability to pay at present or in the future undergo a strict screening and fail to pass the credit screening. In addition, rank information about the credit limit can be obtained, for example, from the operational status of the vehicle, thereby facilitating determination of the credit limit. Furthermore, the rank information is classified in accordance with the operational information for a plurality of vehicles and/or the income information, whereby the credit limit can be determined appropriately.

The credit screening support method according to the eleventh aspect of the present invention can obtain the credit information, for example, from the operational status of the vehicle and increase the credit limit based on this credit information. This configuration can solve the problem that those who have the ability to pay at present or in the future undergo a strict screening and fail to pass the credit screening. In addition, rank information about the credit limit can be obtained, for example, from the operational status of the vehicle, thereby facilitating determination of the credit limit.

Furthermore, the rank information is classified in accordance with the operational information for a plurality of vehicles and/or the income information, whereby the credit limit can be determined appropriately.

The credit screening support program according to the twelfth aspect of the present invention achieves the effect similar to that of the credit screening support method of the eleventh aspect.

The storage medium according to the thirteenth aspect of the present invention stores therein the credit screening support program that achieves the effect similar to that of the credit screening support method of the eleventh aspect.

BRIEF DESCRIPTION OF DRAWINGS

FIG. 3 is an example in which a normal distribution is applied to credit information computation.

FIG. 4 is an example in which a normal distribution is not applicable to credit information computation.

FIG. 5 is a flowchart of vehicle starting control.

FIG. 6 is an illustration of a vehicle-mounted device and wiring thereof.

FIGS. 7A and 7B are illustrations of relay values, in which FIG. 7A illustrates a case of a vehicle type having one starting control line and FIG. 7B illustrates a case of a vehicle having two starting control lines.

FIG. 12 is a flowchart of an engine-associated control unit.

FIG. 13 is an illustration of a starting-disabled state for each vehicle type.

DESCRIPTION OF EMBODIMENTS

A credit screening support system, a vehicle-mounted device, a vehicle, a server, a credit screening support method, a credit screening support program, and a storage medium according to embodiments of the present invention will be described below with reference to the drawings. It should be noted that the embodiments below merely illustrate a credit screening support system, a vehicle-mounted device, a vehicle, a server, a credit screening support method, a credit screening support program, and a storage medium for embodying the technical concept of the present invention. The present invention is not intended to be limited thereto and is applicable equally to other embodiments encompassed by the claims.

First Embodiment

Figure 1:
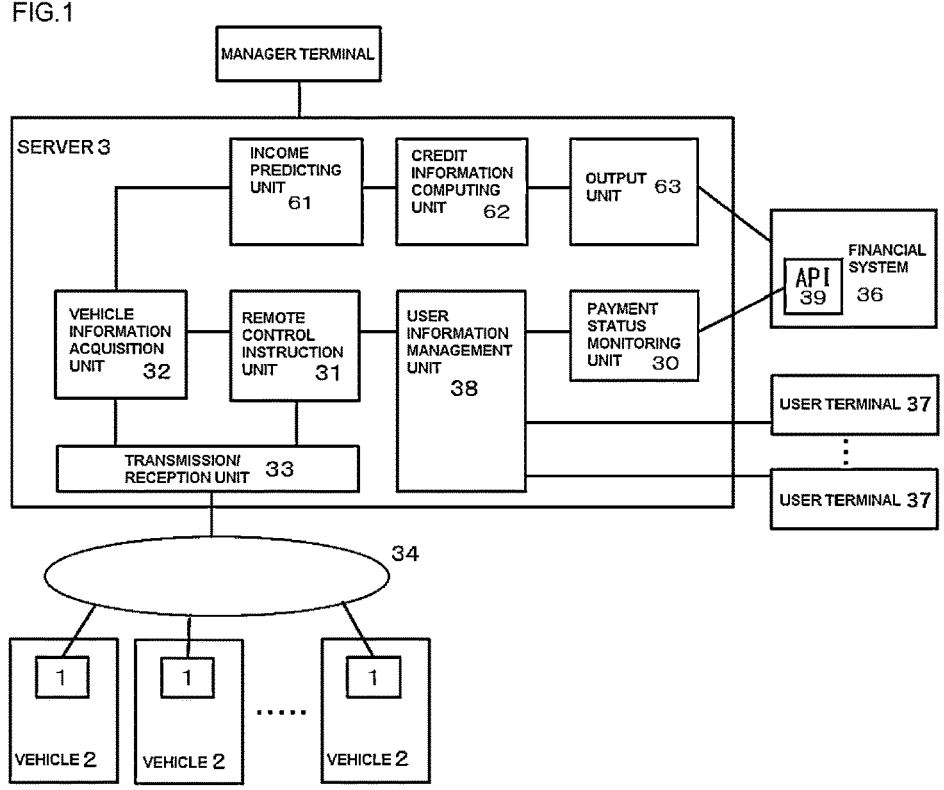
FIG. 1 is an overview of a credit screening support system.

A credit screening support system according to a first embodiment will be described with reference to FIG. 1 to FIG. 12. FIG. 1 is an overview of the credit screening support system. Although an example in the case of car leasing is described here, the present invention is not limited thereto and is applicable to, for example, selling a vehicle with a loan. This system can control the vehicle starting state in accordance with the user's payment status and grasp the operational state of the vehicle to compute credit information. Vehicles 2 are provided to users, and vehicle-mounted devices 1 are installed in the vehicles 2. A server 3 communicates with the vehicle-mounted devices 1 to manage the vehicles.

The server 3 includes a user information management unit 38, a payment status monitoring unit 30, a remote control instruction unit 31, a vehicle information acquisition unit 32, and a transmission/reception unit 33. The payment status monitoring unit 30 monitors the user's payment status using an application programing interface (API) 39 of a financial system 36. "API is a protocol that defines procedures and data formats for invoking and using functions of a computer program (software) and data to be managed from an external different program (IT glossary e-Words)." When the functions generally used in an external different program are provided in the form of a platform such as an OS and middleware, the procedures for invoking and using the functions of the platform are defined by an API. Developers of external programs can use the functions invoked by the API to reduce the burden of developing the functions. The payment status management unit 30 can monitor the status of payment by a user through the financial system 36 in real time using the API 39 of the financial system 36 and thus can promptly detect that the user has made a predetermined payment. The user information management unit 38 can grasp the user's real-time payment status monitored by the payment status monitoring unit 30.

One vehicle-mounted device 1 is installed per vehicle. The vehicle-mounted device 1 may be installed in any location in the vehicle. When the vehicle-mounted device 1 is an add-on part, it can be installed at a place easy to access such as under the passenger's seat. When the vehicle-mounted device 1 is installed for an antitheft purpose, it can be disposed at a place difficult to remove from the vehicle-mounted device 1, for example, in the lower portion of the engine compartment or the inside of the instrument panel. Alternatively, the vehicle-mounted device 1 may be built in beforehand during manufacturing of the vehicle 2. The vehicle-mounted device 1 transmits vehicle information on the vehicle 2 acquired by vehicle information detecting means to the server through a wireless communication network 34 and receives a relay control signal from the server 3 through the wireless communication network 34 to control an external relay 20 (see FIG. 6) for the vehicle 2 described later. The following description refers to FIG. 6. The vehicle information as "operational information" includes, for example, position information from a GPS 24 mounted on the vehicle 2, information of power supply input from an external battery 21, IGN input information from a running state identification line (ACC line, IG line) 22, information on the external relay 20 that controls a starting state of the vehicle 2, speed information, tachometer information, tachograph information, door lock information, immobilizer information, engine start button information, taximeter information, information on the amount of depression of the accelerator pedal (for example, including information on the degree of opening of the throttle valve, which applies to the following description), and a variety of other information with which a vehicle operational status can be grasped. A starting-disabled state and a starting-enabled state of the vehicle can be switched by controlling the external relay 20. In the case of an internal combustion engine vehicle, the engine is unable to be started in the starting-disabled state (this is not to switch off the started engine but to prohibit restarting of the engine), whereas the engine is able to be started in the starting-enabled state. Here, the wireless communication network 34 may be any network, and examples include 2G, 3G, 4G, 5G, Wi-Fi (registered trademark), WiMAX (registered trademark), wireless LAN, beacons, Bluetooth (registered trademark), and ZigBee (registered trademark).

The server 3 includes a remote control instruction unit 31 that generates a relay control command for the vehicle-mounted device 1, a vehicle information acquisition unit 32 that acquires vehicle information from the vehicle-mounted device 1, and a transmission/reception unit 33 that transmits/receives data to/from the vehicle-mounted device. The server 3 is connected to a manager terminal 35, the financial system 36, and a user terminal 37. Examples of the user terminal 37 include a personal computer (hereinafter referred to as "PC"), a mobile phone, and a smartphone. The payment status monitoring unit 30 of the server 3 is connected to the API 39 of the financial system 36 to determine whether each user makes a predetermined payment within a predetermined time limit. The transmission/reception unit 33 performs wireless communication with a plurality of the vehicle-mounted devices 1 through the wireless communication network 34. The manager terminal 35 includes a display for presenting information to the manager and information input means for inputting information from the manager, and examples thereof include a PC, a tablet terminal, and a portable terminal. For example, a touch panel display, a keyboard, and a mouse can be used as the information input means. In the case of a touch panel display, a separate keyboard can be omitted.

The server 3 can grasp a vehicle operational status from the vehicle information periodically received from the vehicle-mounted device 1. The server 3 receives vehicle information from the vehicle-mounted device 1 to grasp, if necessary, the parking status, that is, whether the vehicle is parked at a predetermined parking area or the vehicle is parked at a location other than a predetermined parking area, the operational status of the vehicle 2, the usage status of the vehicle 2 for commuting, the operational status of the vehicle 2 in the case where the vehicle 2 is a taxi, the operational status of the vehicle 2 in the case where the vehicle 2 is a vehicle for business use, the operational status of the vehicle 2 in the case where the vehicle 2 is a vehicle for transportation, the operational status of the vehicle 2 in the case where the vehicle 2 is a construction machine, and information indicating the possibility that the vehicle is stolen. The determination as to whether each user makes a predetermined payment within a predetermined time limit, the determination as to whether to change the corresponding vehicle to a starting-disabled state, the determination of the vehicle operation state described later, and an inquiry to the user and reporting to the police in the event of theft or abnormality described later may be automatically performed by the server 3 or may be partially or entirely performed manually by the manager. When these determinations are partially or entirely performed manually by the manager, the server 3 need not make a complicated condition determination, and the configuration of the server 3 can be simplified.

Figure 2:
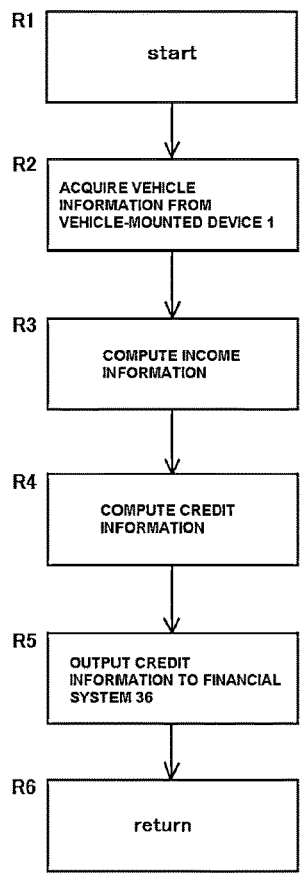
FIG. 2 is a flowchart of credit information computation.

The server 3 further includes an income predicting unit 61, a credit information computing unit 62, and an output unit 63, and performs computation as illustrated in the flowchart in FIG. 2. At step R1, computation starts. At step R2, the vehicle information acquisition unit 32 serving as "input means" acquires vehicle information from the vehicle-mounted device 1. At step R3, the income predicting unit 61 predicts income information on the user of the vehicle 2 using the vehicle information as described later. At step R4, the credit information computing unit 62 computes credit information including rank information about a credit limit classified into a plurality of stages for each category of users, based on the income information. The credit information computing unit 62 may compute credit information using the vehicle information. In this case, computation of income information by the income predicting unit 61 may be omitted. More specifically, step R3 may be omitted, the process may proceed from step R2 directly to step R4, and at step R4, credit information may be computed using the vehicle information acquired at step R2. At step R4, credit information may be computed using the vehicle information in addition to the income information. At step R5, the output unit 63 outputs credit information to the financial system 36. After step R5, at step R6, the process returns to step R1 and performs the next computation. Each step will be described in detail below.

At step R2, the vehicle information acquisition unit acquires vehicle information from the vehicle-mounted device 1 through the wireless communication network 34 and the transmission/reception unit 33. Examples of the vehicle information include the position information from the GPS 24 mounted on the vehicle 2, the information of power supply input from the external battery 21, the IGN input information from the running state identification line (ACC line, IG line) 22, the information on the external relay 20 that controls a starting state of the vehicle 2, the speed information, the tachometer information, the tachograph information, the door lock information, the immobilizer information, the engine start button information, the taximeter information, the information on the amount of depression of the accelerator pedal, and a variety of other information with which the vehicle operational status can be grasped, as described above.

At step R3, the income predicting unit 61 predicts income information on the user of the vehicle 2 using the vehicle information. For example, when the vehicle is a truck for transportation, the longer operating time of the vehicle indicates that orders related to transport are steady. Income therefore can be predicted using the operating time of the vehicle as an index related to the income of the user. The entire operating time of the vehicle is not necessarily travel for carrying a cargo. Position information from the GPS and tachograph information may be combined in analysis, so that a particular delivery route can be grasped, and the operational status of the vehicle that contributes to income can be analyzed. Vehicle information acquired from a plurality of vehicle-mounted devices 1 may be analyzed for each category of vehicles or users, so that the operational status of the vehicle that contributes to income can be grasped more appropriately among various operational statuses of vehicles. AI may be useful for analyzing an enormous amount of vehicle information from a large number of vehicle-mounted devices 1. The vehicle information acquired by the vehicle information acquisition unit 32 and the user income information related thereto may be used to train AI, thereby further improving the accuracy of predicting income information in the income predicting unit. The income predicting unit 61 employs various prediction methods in accordance with the category of the vehicle 2 and the user. The prediction methods are illustrated by (1) to (5) below.

(1) Example of Privately Owned Taxi

When the vehicle is a privately owned taxi, it can be expected that the longer distance in the occupied state indicates that the user has a higher income. For example, the taximeter has four modes: "vacant", "occupied", "out of service", and "on the way to pick up". However, the present invention is not intended to limit the modes of taximeter and may use any vehicle information with which the distance corresponding to "occupied" can be grasped. The meter indication and the income state are as follows. "Vacant" is a state in which the taxi carries no passenger and is available for passengers. No income is expected in this state. "Occupied" is a state in which the taxi carries a passenger and yields an income. The longer the distance occupied, the higher the income. "Out of service" is a state not available for passengers, such as when the driver finishes work and goes back to the depot or when the driver does not pick up passengers, for example, during a break. No income is expected in this state. "On the way to pick up" is when the driver is on the way to pick up a passenger who made a reservation and can charge a fare to yield an income. The income of the user can be predicted by calculating the travel time and the distance traveled in the occupied state and on the way to pick up.

The income of the user can be predicted more accurately, for example, by:
 obtaining the vacant ratio or the occupied ratio to the distance traveled, and grasping whether income is produced efficiently;
 grasping the work time from the distance traveled and the travel time in commercial operation (vacant, occupied, on the way to pick up);
 predicting expenses by calculating the fuel consumption using position information from the GPS, speed information, tachometer information, tachograph information, information on the amount of depression of accelerator pedal, etc.; and
 predicting demand in the region where the user drives, using position information from the GPS, speed information, tachometer information, tachograph information, etc.

(2) Example of Truck for Transportation

When the vehicle is a truck for transportation, the longer distance traveled indicates that the distance over which the transport truck carries a cargo is long, that is, orders related to transportation are steady. The distance traveled therefore can serve as an index for predicting income. When the user is a transportation company which owns a plurality of trucks for transportation, the entire income of the user can be predicted by grasping the operational status of each vehicle. The income of the user can be predicted more accurately, for example, by:
 grasping the operating rate of a vehicle from the distance traveled and the travel time;

grasping whether the vehicle travels on a particular delivery route using position information from the GPS;

grasping the status of cargo, the amount of cargo, and the presence/absence of cargo from position information from the GPS, speed information, tachometer information, tachograph information, information on the amount of depression of accelerator pedal, etc.;

estimating the status of cargo from position information from the GPS, speed information, tachometer information, tachograph information, information on the amount of depression of the accelerator pedal, etc. and grasping the distance with cargo loaded relative to the distance traveled, or the loading ratio of cargo; and predicting expenses by calculating the fuel consumption using position information from the GPS, speed information, tachometer information, tachograph information, information on the amount of depression of the accelerator pedal, etc.

(3) Example of Construction Machine

When the vehicle is a construction machine such as a digger or a crane, the operating time of the vehicle indicates a period of time in which the vehicle is used for a predetermined work. The operating time of the vehicle therefore serves as an index for predicting the income of the user. When the user is a company which owns a plurality of construction machines, the entire income of the user can be predicted by grasping the operational status of each construction machine. The income can be predicted more accurately, for example, by:

grasping the distance of move from the standby location to the site of work from position information from the GPS, speed information, tachometer information, tachograph information, etc.;

grasping the work period and the work details at a particular site of work from hour meter information on a construction machine, IGN input information, engine start button information, etc.; and predicting expenses by calculating the fuel consumption using hour meter information on a construction machine, IGN input information, engine start button information, fuel indicator information, etc.

(4) Example of Use of Vehicle for Commute

Whether the user using the vehicle for commute has been commuting can be determined from the operational status of the vehicle. The operational status of the vehicle therefore serves as an index for predicting the income of the user. Since the user may sometimes use the vehicle for a purpose other than commuting, it is necessary to grasp the situation in which the vehicle is used for commute in order to predict the income of the user more accurately. For example, position information from the GPS can be used to confirm that movement of the vehicle from a specific parking area to a predetermined location related to work (for example, a parking space of the workplace) is related to going to work.

(5) Example of Vehicle for Business Use

When the vehicle is a vehicle for business use, the vehicle is used mainly for business activities. Since the status of business activities can be determined from the operational status of the vehicle, the operational status of the vehicle serves as an index for predicting the income of the user. For example, position information from the GPS can be used to specify a region or a range in which business activities are performed, so that the status of business activities can be grasped more accurately.

At step R4, the credit information computing unit 62 computes credit information including rank information about a credit limit classified into a plurality of stages for each category of users, based on the income information. Users are classified into a plurality of categories, for example, including owners of privately owned taxis, owners of trucks for transportation, owners of construction machines, those who use vehicles for commute, and owners of vehicles for business use, in accordance with the types of users' business, the kinds of vehicles, and the usage modes of vehicles. The income information of each user is statistically analyzed for each category, and rank information corresponding to income information is computed. Each user is given rank information in descending order of predicted income: the top less than 10% is given rank A, 10% or more to less than 30% is given rank B, and 30% or more to less than 70% is given rank C, and 70% or more is given rank D. The credit information including this rank information is provided to the financial system 36 and used to determine the credit limit of a user in the financial system 36. For example, the financial system 36 can increase the credit limit of a user whose rank information is rank A by 1.5 times, increase the credit limit of a user with rank B by 1.2 times, keep the credit limit of a user with rank C as it is, and reduce the credit limit of a user with rank D by 0.8 time. The credit limit of a user expected to have a high income thus can be increased. For a user with a low income, the credit limit of the user may be reduced. Conventionally, since the credit limit is determined, for example, based on the business performance in the past five years, it takes time for users such as individuals or small- and medium-sized firms to increase the credit limit even when the business performance at present is good or improvement in business performance is expected in the future. By contrast, the present embodiment can increase the credit limit by estimating income from vehicle information, so that the credit limit appropriate for the business performance is ensured for a short term (for example, a year or several months). Even a user with a high credit limit in the past may suffer a business slump at present. The present embodiment can estimate a drop of the income of the user and therefore can prevent insolvency due to the credit limit kept beyond the ability.

Next, an example in the case where it is assumed that an income prediction value included in the income information of each user follows a probability distribution will be described as an example of the statistical processing at step R4. The income prediction value of each user is statistically processed to produce a deviation value of the user. Here, the deviation value of each user follows a normal distribution as illustrated in FIG. 3. FIG. 3 is an example in which a normal distribution is applied to credit information computation. Each user is given rank information based on the deviation value of the user in descending order of predicted income such that the top less than 10% is given rank A, 10% or more to less than 30% is given rank B, 30% or more to less than 70% is given rank C, and 70% or more is given rank D. This deviation value may be included in the credit information. When a deviation value is used as credit information, the credit limit can be determined more minutely for each user through statistical computation, compared with when rank information is used in the financial system 36. The ranking of the income prediction value may be further included as credit information. The financial system 36 thus can determine the credit limit of each user promptly and appropriately, using the credit information including the rank information, the deviation value, and the ranking of the income prediction value.

An example in the case where the income prediction value included in the income information of each user does not follow a probability distribution will now be described as an example of the statistical processing at step R4. The income prediction value of each user does not necessarily follow a normal distribution as previously mentioned. In such a case, the statistical processing using a deviation value as described above is not always appropriate. Even when the income prediction value of each user does not follow a normal distribution, rank information can be obtained by aggregating users in descending order of income prediction values as illustrated in FIG. 4. FIG. 4 is an example in which a normal distribution is not applicable to credit information computation. Each user can be given rank information in descending order of user's income prediction value such that the top less than 10% is given rank A, 10% or more to less than 30% is given rank B, and 30% or more to less than 70% is given rank C, and 70% or more is given rank D. The ranking of the income prediction value may be included as credit information. The financial system 36 thus can determine the credit limit of each user promptly and appropriately, using the credit information including the rank information and the ranking of the income prediction value.

The computation of credit information in the case where step R3 is omitted will now be described. Step R3 is omitted, and the process proceeds from step R2 directly to step R4. At step R4, credit information can be computed using the vehicle information acquired at step R2. For example, in the case (1) where the vehicle is a privately owned taxi, since the distance in the occupied state generally dictates the user's income, the step of computing income information in the income predicting unit 61 at step R3 may be omitted, and at step R4, the credit information computing unit 62 may compute credit information directly from vehicle information including data of a total distance in the occupied state. In the case (2) where the vehicle is a truck for transportation, credit information can be computed directly from vehicle information including the distance traveled with cargo loaded.

At step R4, the credit information computing unit 62 may compute credit information in consideration of vehicle information in addition to income information. For example, in the case (1) where the vehicle is a privately owned taxi, credit information may be computed in consideration of the travel time of the business operation state (vacant, occupied, on the way to pick up) which is vehicle information, in addition to the income prediction value of each user which is the income information obtained at step R2. For example, when the business operation state is a longer time, this can be regarded as an index indicating diligence and suggests that increase in future income is expected.

Means for outputting credit information to the financial system 36 in the output unit 63 at step R5 will now be described. Credit information can be output from the output unit 63 to the financial system using any communication means. For example, the output unit 63 may be provided with an API. When the output unit 63 is provided with an API, the financial system 36 accesses the server through the API of the output unit 63, so that the server can provide the financial system 36 with credit information of each user.

A method of automatically determining the vehicle operation status by the server 3 will now be described in detail. When the power of the vehicle is in the off state for a predetermined time or longer at a place equivalent to a parking area registered in advance, it is determined that the vehicle is parked at a predetermined parking area. When the power of the vehicle is in the off state for a predetermined time or longer at a place other than the parking area registered in advance, it is determined that the vehicle is parked at a place other than the predetermined parking area. When the vehicle is at a place other than the parking area registered in advance and the power of the vehicle is not in the off state for a predetermined time or longer, it is determined that the user is moving using the vehicle.

When the vehicle is out of the range registered in advance by the user for a predetermined period or longer, it is determined that there is a possibility that the vehicle has been stolen. If it is determined that there is a possibility that the vehicle has been stolen, the contact registered in advance by the user is notified of the vehicle operation status, and an inquiry is made as to whether a theft has occurred. If there is no reply from the user within a predetermined time limit or if there is a reply indicating theft from the user, a notification of theft is given to the manager, and a relay control command corresponding to the starting-disabled state is transmitted to the vehicle-mounted device 1. If the manager receives a notification of theft from the server 3, the manager makes contact with the user to check on the occurrence of theft and then reports the vehicle theft to the police if necessary.

The vehicle-mounted device 1 further includes means for detecting an abnormality such as removal of the vehicle-mounted device 1 from the vehicle 2 or cutting-off or removal of wiring connected to the vehicle-mounted device 1. When such an abnormality is detected, the vehicle-mounted device 1 notifies the server 3 of the occurrence of abnormality. When this notification is given, the server 3 promptly gives a notification to the manager. When receiving the notification of abnormality from the server 3, the manager makes contact with the user to check on the occurrence of theft and then reports the vehicle theft to the police if necessary.

Examples of possible cases where the vehicle-mounted device 1 has been removed from the vehicle 2 include (1) theft by a thief, (2) misuse of the vehicle by the user, and (3) use of the vehicle in an unavoidable and urgent case by the user who has not paid. In the cases of theft and misuse as in (1) and (2), it is desirable to set the vehicle to the starting-disabled state. On the other hand, in the urgent case as in (3), for example, when an emergency patient is to be transported, it is desirable to set the vehicle to the starting-enabled state. As will be described later, the external relay 20 can switch its connection to select a mode of setting the starting-disabled state or a mode of setting the starting-enabled state when the wiring is cut off or removed. Accordingly, the external relay 20 may preset to enter the starting-disabled state if the vehicle-mounted device 1 detects the abnormality or if the manager assumes theft or misuse as in the cases (1) and (2) when the wiring of the external relay 20 is cut off or removed, whereas the external relay 20 may preset to enter the starting-enabled state if the manager assumes an urgent case as in the case (3).

Referring to FIG. 5, taking car leasing as an example, control of switching the vehicle to the starting-disabled state when a user fails to make a predetermined payment for the vehicle and control of switch the vehicle to the starting-enabled state again when a user makes a predetermined payment is described. FIG. 5 is a flowchart of vehicle starting control.

At step A1, the flow starts. At step A2, at the shipment (delivery) of a vehicle, the engine starting external relay 20 of the vehicle is set to the starting-enabled state such that the starting of the vehicle is possible. At step A3, the payment status monitoring unit 30 monitors the payment status of the user in real time using the API 39 of the financial system 36. At step A4, the payment status monitoring unit 30 determines whether the user of each vehicle has paid the usage fee within a predetermined time limit (whether there is a delinquency). When the usage fee is not paid within a predetermined time limit (Yes at step A4), the process proceeds to step A5. At step A5, the user is warned that the vehicle will be switched to the starting-disabled state unless the charge is paid within a predetermined time limit, due to the unpaid charge. The process then proceeds to step A6. If No at step A4, the process returns to step A3.

At step A6, the payment status monitoring unit 30 monitors the payment status of the user in real time using the API 39 of the financial system 36. At step A7, the payment status monitoring unit 30 determines whether the user of each vehicle has paid the usage fee within a predetermined time limit. If No in the determination at step A7, the process proceeds to step A8. At step A8, the operation status of the vehicle is checked, and if a predetermined condition is satisfied, the server 3 transmits an engine starting relay control command corresponding to the starting-disabled state from the remote control instruction unit 31 to the corresponding vehicle-mounted device 1 in order to set the corresponding vehicle 2 to the starting-disabled state. The process then proceeds to step A9. The vehicle-mounted device 1, receiving the engine starting relay control command corresponding to the starting-disabled state, switches the engine starting external relay 20 to the starting-disabled state to bring the corresponding vehicle 2 into the starting-disabled state. Specifically, in the case of an internal combustion engine vehicle, starting the engine is disabled. In the present embodiment, if Yes at step A4 (if a delinquency is detected), at step A5, the user is once warned that the vehicle will be switched to the starting-disabled state. However, the present invention is not limited thereto. For example, if Yes at step A4, the process may proceed directly to step A8 to switch the vehicle to the starting-disabled state. In this way, when a delinquency is detected, whether the process proceeds directly to step A8 to switch the vehicle to the starting-disabled state or a warning is once issued to give a grace period before the vehicle is switched to the starting-disabled state is determined in consideration of, for example, the ordinance in the region of interest and business custom.

On the other hand, if Yes in the determination at step A7, the process returns to step A3, and the payment status monitoring unit 30 monitors the payment status of the user in real time using the API 39 of the financial system 36. In the absence of an engine starting relay control command corresponding to the starting-disabled state from the server 3 to the vehicle-mounted device 1, the engine starting external relay 20 is usually set to the starting-enabled state. When a usage fee is paid within a predetermined time limit (Yes at step A7), the server 3 does not transmit an engine starting relay control command corresponding to the starting-disabled state to the vehicle-mounted device 1, so that the engine starting external relay 20 remains in the starting-enabled state, and the corresponding vehicle 2 is in the starting-enabled state. Specifically, in the case of an internal combustion engine vehicle, starting the engine is enabled.

At step A9, the user is notified that the vehicle is in the starting-disabled state due to unpaid usage fee and is prompted to pay a predetermined fee by a specified deadline. The process then proceeds to step A10. At step A10, the payment status monitoring unit 30 monitors the payment status of the user in real time using the API 39 of the financial system 36. At step A11, the payment status monitoring unit 30 determines whether the user of the vehicle has paid the usage fee within a predetermined time limit. If Yes in the determination at step A11 (if the fee has been paid), the server 3 transmits an engine starting relay control command corresponding to the starting-enabled state from the remote control instruction unit 31 to the corresponding vehicle-mounted device 1 in order to set the corresponding vehicle to the starting-enabled state again. When the vehicle-mounted device 1 receives the engine starting relay control command corresponding to the starting-enabled state, the engine starting external relay 20 is switched to the starting-enabled state, and the corresponding vehicle enters the starting-enabled state again.

When the charge is a monthly fee, it is determined whether a predetermined amount of money has been paid, for example, no later than 25th of the previous month (corresponding to step A4). If a predetermined amount has not been paid, a message is transmitted to the user to indicate that the user is delinquent and if a predetermined charge fails to be paid within one week, the vehicle will be set to the starting-disabled state (corresponding to step A5). If a predetermined charge is not paid within one week from transmission of this message, the server 3 checks the vehicle operation status and then transmits an engine starting relay control command corresponding to the starting-disabled state from the remote control instruction unit 31 to the corresponding vehicle-mounted device 1 under the condition that a predetermined condition is satisfied (corresponding to step A8). If the user does not pay a predetermined fee after the elapse of a predetermined period of time, for example, one month since the vehicle was set to the starting-disabled state (No in the determination at step A11), the manager makes arrangements to retrieve the vehicle, using the position information on the vehicle acquired by the vehicle information acquisition unit 32 (corresponding to step A14. Subsequently, at step A15, the process ends).

On the other hand, if the deposit of a predetermined amount of money by the user is confirmed within a predetermined time limit after the engine starting relay control command corresponding to the starting-disabled state is transmitted to the vehicle-mounted device 1 (Yes in the determination at step A11), the server 3 transmits an engine starting relay control command corresponding to the starting-enabled state from the remote control instruction unit 31 to the corresponding vehicle-mounted device 1 and sets the vehicle to the starting-enabled state again (corresponding to step A12). In the absence of an engine starting relay control command corresponding to the starting-disabled from the server 3 to the vehicle-mounted device 1, the engine starting external relay 20 is usually set to the starting-enabled state, and thus the corresponding vehicle is set in the starting-enabled state. Accordingly, the user can use the vehicle kept in the starting-enabled state as long as the user pays a predetermined fee no later than 25th every month.

After the vehicle is switched to the starting-disabled state at step A8 and the user is prompted to make a predetermined payment at step A9, if the user wishes to immediately use the vehicle, the user will promptly make a payment. In this case, as the user wishes to use the vehicle immediately, a time lag between the predetermined payment and the actual switching of the vehicle from the starting-disabled state to the starting-enabled state is unfavorable for the user who wants to use the vehicle immediately. Accordingly, the payment status of the user is monitored in real time using the API 39 of the financial system 36 at step A10, so that the predetermined payment by the user can be grasped in real time at step A11, and immediately after the predetermined payment, the server 3 transmits an engine starting relay control command corresponding to the starting-enabled state from the remote control instruction unit 31 to the corresponding vehicle-mounted device 1 and sets the vehicle to the starting-enabled state again at step A12. The process returns at step A13.

In setting the vehicle 2 to the starting-disabled state, it is necessary to consider the operation state of the vehicle. That is, switching to the starting-disabled state while the user is moving on the vehicle may produce a severe situation for the user and, in addition, may cause a hindrance to the other traffic. Moreover, as will be described later, the switching to the starting-disabled state of the external relay in the power-on state of the vehicle may cause trouble depending on the kind of vehicle, and there may exist some conditions to be avoided in view of safety. Here, a description will be made, with examples, of a case where the server 3 automatically determines the operation state of the vehicle and switches the vehicle to the starting-disabled state and a case where the switching to the starting-disabled state is deferred. For example, the server 3 checks the vehicle operation status from the GPS position information and the vehicle power on/off information acquired from the vehicle, determines that the vehicle is parked at a predetermined parking area under the condition that the power of the vehicle is off and the vehicle is in a predetermined parking area, and transmits a relay control command to set the external relay 20 to the starting-disabled state to the vehicle-mounted device 1 of the corresponding vehicle 2, thereby switching the vehicle 2 to the starting-disabled state. In this case, because the vehicle 2 is parked at a predetermined parking area, there is no possibility that the other traffic is hindered. For example, the server 3 checks the vehicle operation status and, if the power of the vehicle is on and the vehicle is in a place that is not a predetermined parking area, determines that the user is using the vehicle, and defers transmitting a relay control command for switching the external relay 20 to the starting-disabled state to the vehicle-mounted device 1 of the corresponding vehicle. In this way, in the present invention, the vehicle-mounted device 1 is configured to determine the safety as will be described later, and thus the determination in the server 3 can be relatively simplified.

In the example described here, the determination as to whether each user has paid a predetermined fee within a predetermined time limit, the transmission of a message to the user, the determination as to the operation state of the vehicle, the determination as to transmission of a relay control command corresponding to the starting-enabled state and the starting-disabled state, and the inquiry to the user and reporting to the police in the event of theft or abnormality are all performed automatically by the server. However, some or all of the determinations may be performed manually by the manager from the manager terminal 35.

The configuration of the vehicle-mounted device 1 and the connection to the vehicle 2 is now described with reference to FIG. 6. FIG. 6 illustrates an example of connection to an internal combustion engine vehicle. The same parts as in FIG. 1 to FIG. 5 are denoted with the same reference signs and will not be further elaborated. FIG. 6 illustrates a CPU 11 for arithmetic operations, a wireless communication module 12 for communicating by radio with the transmission/reception unit of the server 3 through a wireless communication network, a memory 13 configured, for example, as a nonvolatile memory for storing therein a state of the relay, a console 14 for making a variety of settings for the vehicle-mounted device, an internal battery 15 which is a battery inside the vehicle-mounted device to be charged with power from the external battery 21 of the vehicle 2, a power supply input detecting unit 16 for detecting power supply input from the external battery 21 of the vehicle 2, an IGN input detecting unit 17 connected to the running state identification line (ACC line, IG line) 22 of the vehicle 2 for detecting the on/off state of the engine, a relay input/output unit 18 connected to the external relay 20, and a GPS input/output unit 19 connected to the GPS 24 of the vehicle 2 for detecting the position information on the vehicle. Although not illustrated, the vehicle-mounted device 1 may be configured to detect and acquire acceleration sensor information, vehicle speed pulse information, fuel sensor information, speed information, tachometer information, tachograph information, door lock information, immobilizer information, engine start button information, taximeter information, information on the amount of depression of the accelerator pedal (for example, including information on the degree of opening of the throttle valve, which applies to the following description), and a variety of other information with which the vehicle operational status can be grasped. Such information can be used as vehicle information. Here, the external battery 21 refers to the term distinguished from the internal battery 15 inside the vehicle-mounted device 1 and means an on-vehicle battery. The external relay 20 is connected to the engine starting control line (ST line) of the vehicle 2. Although the external relay 20 is illustrated between the vehicle 2 and the vehicle-mounted device 1 in FIG. 6, the external relay 20 is actually provided in the inside of the engine compartment of the vehicle 2 and the external relay is disposed at a place hidden from the outside. The external relay 20 is thus a structure unable to be removed on purpose by a theft or a user. The relay input/output unit 18 detects whether the external relay 20 is in the starting-disabled state or in the starting-enabled state and performs control such that the external relay 20 is switched to the starting-disabled state or the starting-enabled state based on a relay control command.

The power supply input detecting unit 16 is connected with the external battery 21, the IGN input detecting unit 17 is connected with the running state identification line 22, the relay input/output unit 18 is connected with the external relay 20, and the GPS input/output unit 19 is connected with the GPS 24, each directly with individual wires, not through a vehicle LAN such as CAN. Because a vehicle LAN such as CAN is thus not used, there is no problem of the vulnerability to security risk as is the case in a vehicle LAN such as CAN.

The vehicle-mounted device 1 is driven by electric power of the internal battery 15. The internal battery is always charged with electric power of the external battery 21 of the vehicle 2 and can continuously drive the vehicle-mounted device for a predetermined time even in the event of abnormality such as when the vehicle-mounted device 1 is removed or when the charge line is cut off or removed. For this reason, the server 3 can be notified of the occurrence of abnormality together with the present location information. The latest present location information and other information are stored in the memory 13.

The CPU 11 is connected to, for example, the wireless communication module 12, the memory 13, the console 14, the internal battery 15, the power supply input detecting unit 16, the IGN input detecting unit 17, the relay input/output unit 18, the GPS input/output unit 19, and a not-illustrated acceleration sensor. The power supply input detecting unit 16, the IGN input detecting unit 17, the GPS input/output unit 19, and the acceleration sensor are provided for examples of vehicle information detecting means. The relay input/output unit 18 detects a state of the external relay 20 and controls the external relay 20 to one of the starting-disabled state and the starting-enabled state. The state of the external relay 20 is also usable as the vehicle information.

The CPU 11 controls the external relay 20 and acquires vehicle information under instructions of a program stored in the memory 13. The operation of the vehicle-mounted device 1 will be described below.

<Acquisition of Vehicle Information>

The vehicle-mounted device 1 acquires vehicle information and transmits the vehicle information to the server 3 at predetermined intervals, for example, every 30 seconds, or at a time of occurrence of a certain event such as turning-on of the vehicle power, or both. The vehicle information here includes at least one of information on power supply input from the external battery 21 that is detected by the power supply input detecting unit 16, information on the running state identification line (ACC line, IG line) detected by the IGN input detecting unit 17, for example, information indicating on/off of the engine, the state of the external relay 20 that is detected by the relay input/output unit 18, the position information from the GPS that is detected by the GPS input/output unit 19, information on acceleration that is detected from a not-illustrated acceleration sensor, information on vehicle speed pulse, information on the fuel sensor, and information on the time when the vehicle information is acquired. The speed may be calculated from the GPS position information. The server 3 grasps a vehicle operation status based on such vehicle information.

<Control of External Relay>

When the vehicle-mounted device 1 receives a relay control command from the server 3, the control value thereof is stored into the memory 13, and the external relay 20 is controlled to attain a state corresponding to the value. "Vehicle information-associated control means" includes the CPU 11, the memory 13, the IGN input detecting unit 17, and the relay input/output unit 18 and, when the external relay 20 is switched, determines whether to employ a relay control command and not to employ (ignore a relay control command), considering the on/off switching timing of power of the vehicle, as will be described later. In the case of an internal combustion engine vehicle, the on/off of the power is detected from, for example, information on the running state identification line (ACC line, IG line) that is detected by the IGN input detecting unit 17, for example, information indicating the on/off state of the engine.

A relay control value (the control value for the ST line relay) in a case where the engine starting control line (ST line) in an internal combustion engine vehicle is cut by the external relay 20 (the case in FIG. 6) is now described with reference to FIGS. 7A and 7B. FIG. 7A illustrates the case of a vehicle type having one engine starting control line, and FIG. 7B illustrates the case of a vehicle type having two engine starting control lines. First, the case of the vehicle type having one engine starting control line in FIG. 7A will be described. The relay value is "0" when relay A is open, and it is "1" when closed. There are two external relay control values: "00" and "01". When the external relay control value is "00", the status is the starting-enabled state (normal) and the vehicle state is starting-enabled. On the other hand, when the external relay control value is "01", the status is the starting-disabled state and the vehicle state is starting-disabled.

The vehicle type having two engine starting control lines in FIG. 7B will now be described. When each of the relay A and relay B is open, the relay value is "0", and when closed, the relay value is "1". There are four external relay control values: "00", "01", "10", and "11". When the external relay control value is "00", the status is the starting-enabled state (normal) and the vehicle state is starting-enabled. When the external relay control value is "01", the status is an unintended value and the vehicle state is starting-enabled. When the external relay control value is "10", the status is an unintended value and the vehicle state is starting-enabled. When the external relay control value is "11", the status is the starting-disabled state and the vehicle state is starting-disabled.

A "relay monitoring unit" includes the CPU 11, the memory 13, and the relay input/output unit 18 and monitors the relay state when the external relay control value is supposed to be the starting-enabled state due to a malfunction of firmware, as will be described later. As a result of the monitoring, when the relay state is a state other than the starting-enabled state, the relay state is set to the starting-enabled state, that is, the external relay control value is set to "00", and the external relay 20 is set to the starting-enabled state.

Figure 8:
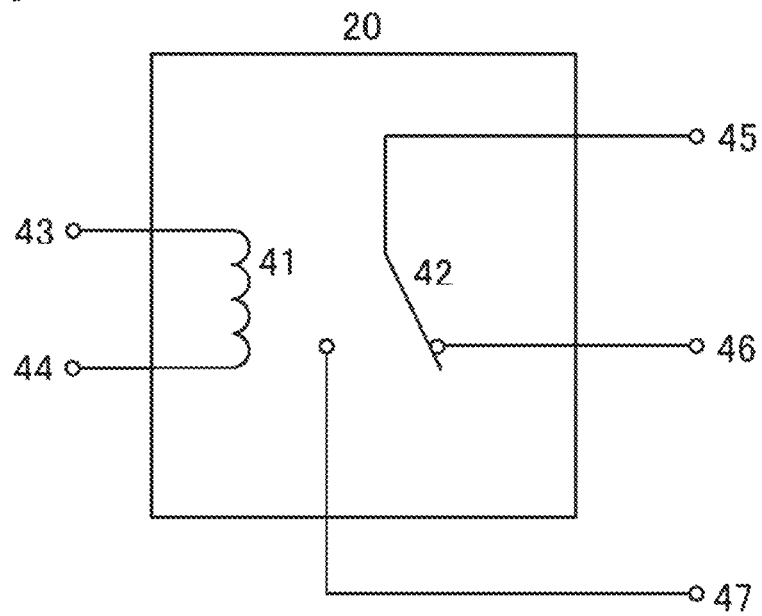
FIG. 8 is an illustration of wiring of a relay.

The wiring of the external relay 20 is now described with reference to FIG. 8. Normally open and normally closed can be selected by changing the connection state of the external relay 20. FIG. 8 illustrates an electromagnetic coil 41, a switch 42, terminals 43 and 44 on the relay input/output unit 18 side, one terminal 45 on the engine starting control line (ST line) side, a normally closed terminal 46, and a normally open terminal 47. Because the switch 42 is biased toward the normally closed terminal 46 by a spring, the switch 42 is in contact with the normally closed terminal 46 side when the coil 41 is not energized. When the coil 41 is energized, the switch 42 is attracted to the electromagnet and comes into contact with the normally open terminal 47. Therefore, when the external relay 20 is intended to be used as the normally closed type, the other terminal of the ST line is connected to the normally closed terminal 46. Conversely, when the external relay 20 is intended to be used as the normally open type, the other terminal of the ST line is connected to the normally open terminal 47.

The difference between when the external relay 20 is intended to be used as the normally closed type and when the external relay 20 is intended to be used as the normally open type is now described with reference to FIG. 6. At least one of the power supply input detecting unit 16, the IGN input detecting unit 17, the relay input/output unit 18, and the GPS input/output unit 19 is provided with means for detecting cutting-off or removal of wiring (not illustrated). As the means for cutting-off or removal of the wiring, known methods such as using a wiring voltage change associated with cutting-off or removal of wiring, for example, as disclosed in Patent Literature 2 can be used. When the power supply input detecting unit 16 does not detect power supply input from the external battery 21, it can be determined that the wiring between the power supply input detecting unit 16 and the external battery 21 has been cut off or removed. The removal of the vehicle-mounted device can also be detected based on the cutting-off or removal of the wiring. It is determined in advance which control to perform, namely, to set the external relay 20 to the starting-disabled state (open) or to the starting-enabled state (closed) when cutting-off or removal of the wiring is detected, as will be described later.

When cutting-off or removal of the wiring is detected, the external relay 20 is controlled as previously mentioned and the server 3 is notified of the abnormality through the wireless communication module 12. When the server 3 receives the notification of the abnormality, the server 3 promptly notifies the manager of it. When receiving the notification of the abnormality from the server 3, the manager makes contact with the user to check on the occurrence of a theft and then reports theft of the vehicle to the police, if necessary. On the other hand, the vehicle-mounted device 1 gives a notification of the abnormality and also produces an alarm sound using an alarm (not illustrated) mounted on the vehicle-mounted device 1. Instead of an alarm mounted on the vehicle-mounted device 1, the horn, headlamp, blinker, hazard lamp, etc. of the vehicle may be used to produce an alarm. In order to do so, wiring may be connected such that an output signal for alarm output of the vehicle-mounted device 1 is input to the input terminals of the control circuits of the horn, headlamp, blinker, hazard lamp, etc.

Here, detection of cutting-off or removal of the wiring has been described as an example of the notification of abnormality. Alternatively, the vehicle-mounted device 1 may further include failure detecting means, so that when the failure detecting means detects a failure of the vehicle-mounted device 1, the server is notified of the failure of the vehicle-mounted device 1 through the wireless communication module 12. When the server 3 receives the notification of a failure of the vehicle-mounted device 1, the server reports the occurrence of a failure to the manager, and the manager receiving the report makes contact with the user of the corresponding vehicle and makes arrangements to repair or exchange the vehicle-mounted device 1.

When cutting-off or removal of the wiring occurs between the relay input/output unit 18 and the external relay 20, current supply to the coil 41 of the external relay 20 is stopped, so that in the case of the normally closed type, the external relay 20 is closed and the ST line is connected, whereas in the case of the normally open type, the external relay 20 is open and the ST line is interrupted (cut).

As previously mentioned, the possible cases when the manager removes the vehicle-mounted device 1 from the vehicle 2 are (1) theft by a thief, (2) misuse of the vehicle by the user, and (3) use of the vehicle in an unavoidable and urgent case by the user who has not made a payment. In the cases of theft and misuse as in (1) and (2), it is desirable to set the vehicle to the starting-disabled state. Therefore, the normally open type is employed as the external relay 20, and it is determined in advance to control the external relay 20 to the starting-disabled state (open) also when cutting-off or removal of the wiring is detected. On the other hand, in the urgent case as in (3), for example, when an emergency patient is to be transported, it is desirable to set the vehicle to the starting-enabled state. Therefore, the normally closed type is employed as the external relay 20, and it is determined in advance to control the external relay 20 to the starting-enabled state (closed) also when cutting-off or removal of the wiring is detected.

The vehicle-mounted device 1 can fail-safe independently, even in a poor radio wave condition and without a relay control command from the server 3. For example, this configuration avoids a situation in which the vehicle enters the starting-disabled state in a place with a poor radio wave condition and becomes unable to receive a relay control command corresponding to the starting-enable information. The vehicle-mounted device repeatedly retries communication to establish communication when the radio wave condition is poor. When communication fails to be established a predetermined number of times, for example, 20 or more retries in succession, it is determined that the communication has failed, and when the state of the external relay 20 is the starting-disabled state, switching to the starting-enabled state is performed. This configuration can avoid a situation in which the vehicle is left in the starting-disabled state because a relay control signal to change to the starting-enabled state is unable to be transmitted from the server 3 in a poor radio wave condition. Whether to employ the process of switching the vehicle to the starting-enabled state at the time of communication failure can be switched at the time of shipment of the vehicle.

<Power Saving Mode>

When the engine of an internal combustion engine vehicle is off, the vehicle-mounted device shifts to a power saving mode to stop the functions except the minimum required functions such as power supply management in order to prevent consumption of power of the external battery 21, after the elapse of a predetermined time, for example, 10 minutes since turning off of the engine. In the power saving mode, the power supply input detecting unit 16, the IGN input detecting unit 17, the relay input/output unit 18, and a timer circuit (not illustrated) are always active whereas the other circuits are stopped. During the power saving mode, the vehicle-mounted device 1 does not communicate with the server 3. During the power saving mode, if the power supply input detecting unit detects loss of power supply input, if the IGN input detecting unit 17 detects the on state of the engine (ACC on or IG on), or if the timer circuit counts a predetermined time (for example, every one hour), the corresponding circuit that is always active even in the power saving mode generates an interrupt to the CPU to switch the vehicle-mounted device 1 from the power saving mode to the normal mode. Because the relay input/output unit is always supplied with power even in the power saving mode, the state of the external relay 20 can be always kept.

<Wireless Communication Module>

As previously mentioned, in the normal mode, the vehicle-mounted device 1 acquires vehicle information and transmits the vehicle information to the server 3 at predetermined intervals, for example, every 30 seconds, or at the time of occurrence of a certain event such as when the vehicle power is turned on, or both. When the corresponding circuit that is always active generates an interrupt to the CPU to switch the vehicle-mounted device 1 from the power saving mode to the normal mode, the vehicle-mounted device 1 originates communication with the server 3 to receive a relay control command or transmit vehicle information. In the normal mode, in addition to communication originating from the vehicle-mounted device 1, the server 3 may originate communication, and the vehicle-mounted device 1 can receive information such as a relay control command. When a radio wave condition is poor, communication may be retried multiple times, for example, five times until communication is established. Even when the radio wave condition is poor and communication fails to be established, the vehicle-mounted device 1 can operate independently, because the vehicle-mounted device 1 stores a relay control command received from the server 3 in the latest communication in the memory. Furthermore, because the acquired vehicle information is stored in the memory, the vehicle-mounted device 1 can transmit the acquired information altogether to the server 3 when the communication line is recovered. It is also possible to prevent transmission or reception of the relay control command corresponding to the starting-disabled state when the radio wave condition is poor. This configuration can avoid the problem of being unable to change from the starting-disabled state to the starting-enabled state because of a poor radio wave condition.

Figure 9:
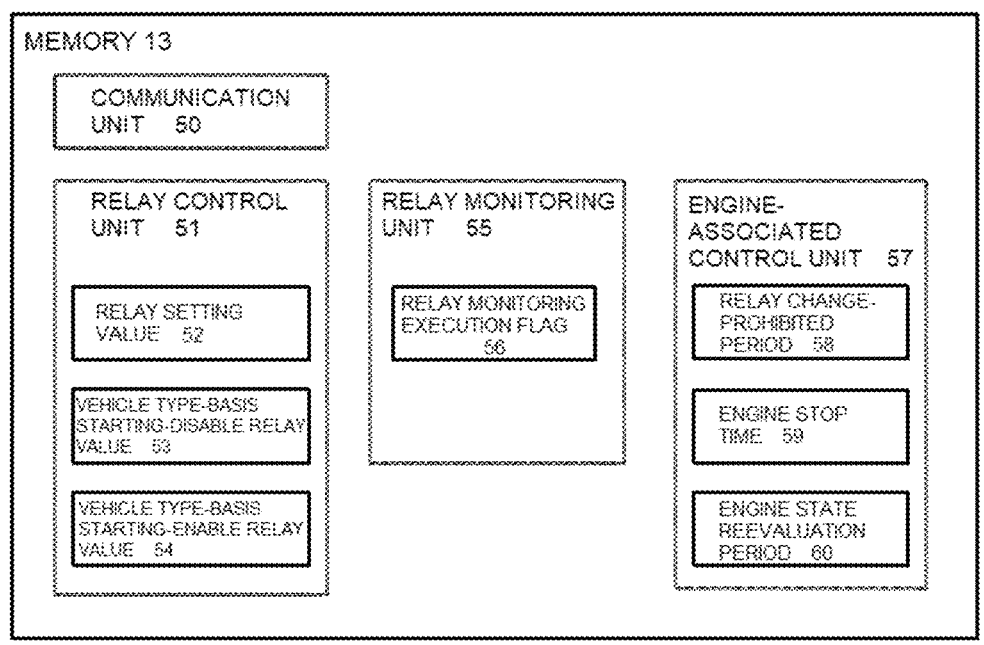
FIG. 9 is an illustration of the configuration in a memory.

A configuration in the memory 13 is now described with reference to FIG. 9. The memory 13 includes four process units: a communication unit 50, a relay control unit 51, a relay monitoring unit 55, and an engine-associated control unit 57. The relay control unit 51 includes a relay setting value 52, a vehicle type-basis starting-disable relay value 53, and a vehicle type-basis starting-enable relay value 54. The relay monitoring unit 55 includes a relay monitoring execution flag 56. The engine-associated control unit 57 includes a relay change-prohibited period 58, an engine stop time 59, and an engine state reevaluation period.

The communication unit 50 is a data region for communication with the server 3 and is used for transmission of vehicle information to the server 3 and reception of a relay control command from the server 3 through the wireless communication module 12. The relay control unit is a data region for changing the external relay 20 to a state corresponding to the relay value provided by the relay control command from the server 3. The relay monitoring unit 55 periodically monitors the state of the external relay 20, based on the relay state value of the starting-disabled state/starting-enabled state set as will be described later, in a situation in which the relay state should be the starting-enabled state, that is, the initial state, or when the last relay change request from the server 3 is to change to the starting-enabled state. As a result of the monitoring, if the external relay 20 is in a relay state other than the starting-enabled state, the state is changed to the starting-enabled state. The engine-associated control unit 57, receiving a relay control command from the server 3, ignores the relay control command if the engine is on for the past X minutes (for example, two minutes), and changes the relay to the starting-enabled state if the engine on is detected for Y seconds (for example, five seconds) after a relay control command for the starting-disabled state is executed.

Here, the ground for setting X minutes to, for example, two minutes will be described. The vehicle-mounted device 1 is switched to the power saving mode 10 minutes or so after the engine stops to suppress consumption of electric power. In the state of the power saving mode, when the user gets into the vehicle, inserts the key into the cylinder to start the engine, and turns the ignition into the on state, the ING input detecting unit 17 detects that the engine is turned into the on state from the running state identification line (ACC line, IG line) 22 and generates an interrupt to the CPU 11 to switch the vehicle-mounted device 1 to the normal mode. It takes about one minute when the radio wave condition is good, and takes about one minute and thirty seconds when the communication has to be retried five times or so because of a poor radio wave condition, until the server 3 recognizes that the vehicle-mounted device 1 has been switched to the normal mode. A relay control command to give an instruction to switch to the starting-disabled state is not employed (ignored) for a certain period after the power of the vehicle is turned off, thereby preventing the vehicle from improperly switching to the starting-disabled state when the power of the vehicle is turned on again immediately after the power of the vehicle is turned off. For example, it is possible to prevent the vehicle from improperly switching to the starting-disabled state in a case where while baggage is unloaded from the trunk or seat in a parking area, the vehicle is temporarily stopped at a position slightly displaced from the parking space, with the power of the vehicle turned off, and after unloading of baggage, the vehicle is pulled into the parking space by turning on the power of the vehicle again. Conversely, when X minutes are too long, the vehicle may be unable to be switched to the starting-disabled state in some cases. Given this, it is determined that the relay control command is ignored when the engine is on for the past two minutes.

The ground for setting Y seconds to, for example, five seconds will now be described. When a relay control command is received while the power of the vehicle is on, the vehicle-mounted device 1 does not accept a relay control command (ignores a relay control command), considering the safety. While the power of the vehicle is on, the user is moving on the vehicle. Thus, improper switching of the vehicle to the starting-disabled state is prevented, for example, when reception of a relay control command to change the vehicle to the starting-disabled state is delayed due to a poor radio wave condition. On the other hand, it takes about three seconds until the vehicle-mounted device 1 recognizes the starting of the vehicle after the vehicle is actually started. If the vehicle-mounted device 1 receives a relay control command immediately after the vehicle is started, the vehicle-mounted device 1 determines that the vehicle is not started and then employs the relay control command, so that the vehicle is switched to the starting-disabled state although the vehicle is started. As will be described later, when the ignition switch is a push button switch, the starting-disabled state is set by invalidating the push button or by activating the immobilizer (cutting the line for authentication). Of these methods, in the case of invalidating the push button, if switching to the starting-disabled state occurs in the three seconds, the engine is unable to be turned off. On the other hand, in the case of activating the immobilizer, if switching to the starting-disabled state occurs in the three seconds, the push button works to allow the engine to be turned off but the gear lever will not move into Drive D. Based on the foregoing, three seconds plus a margin, that is, five seconds are employed as Y seconds.

The variables of the memory 13 illustrated in FIG. 9 will now be described. The relay setting value 52 is a relay value corresponding to the present state of the external relay 20. The vehicle type-basis starting-disable relay value 53 is a setting value for each vehicle type corresponding to the state of the external relay 20 for setting the vehicle to the starting-disabled state. The vehicle type-basis starting-enable relay value 54 is a setting value for each vehicle type corresponding to the state of the external relay 20 for setting the vehicle to the starting-enabled state. The relay monitoring execution flag 56 is a flag for determining whether to execute monitoring of the external relay 20 and is turned on in the initial state (at the time of shipment of the vehicle) or when the last relay control command from the server 3 is to change to the starting-enabled state. The relay change-prohibited period is a period (X minutes, for example, two minutes) during which change of the external relay 20 is prohibited after the engine is stopped. The engine stop time is the time when the previous engine stop is detected. The engine state reevaluation period is a period (Y seconds, for example, five seconds) during which the engine on is reevaluated after the control to set the starting-disabled state is performed.

One of the vehicle type-basis starting-disable relay value 53 and the vehicle type-basis starting-enable relay value 54 may be stored according to the type of the vehicle, or values of different vehicle types may be stored in advance and one of them may be selected according to the type of the vehicle. The vehicle type-basis starting-disable relay value 53 and the vehicle type-basis starting-enable relay value 54 may be set from the console 14 or may be set from the server 3. In terms of fail-safe for noise, it is preferable that the relay values are set from the server 3.

Figure 10:
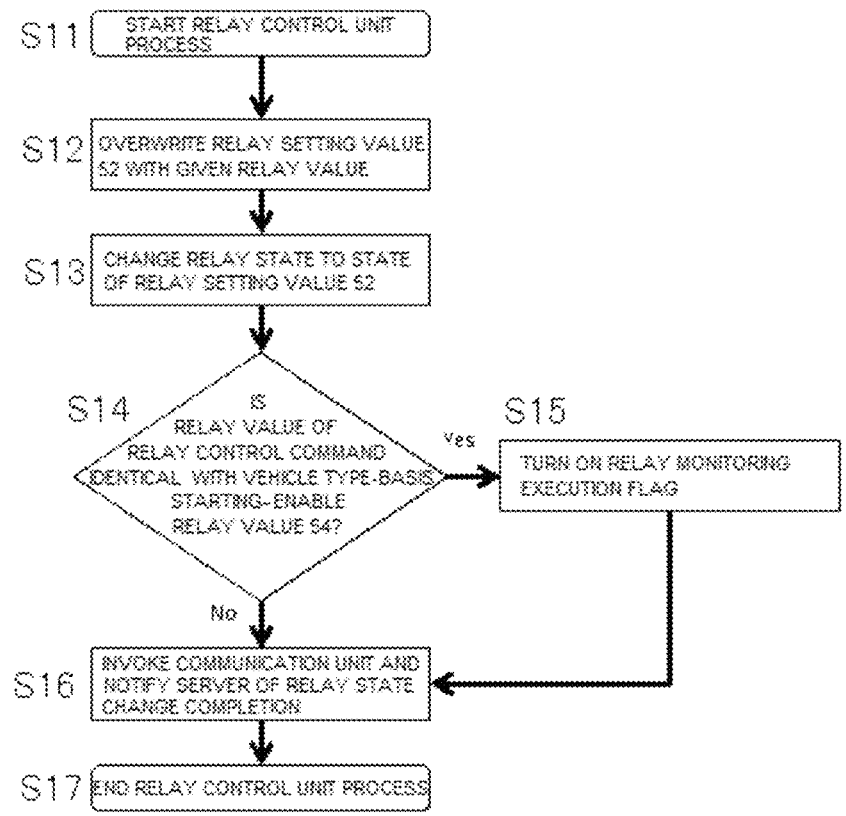
FIG. 10 is a flowchart of a relay control unit.
Figure 11:
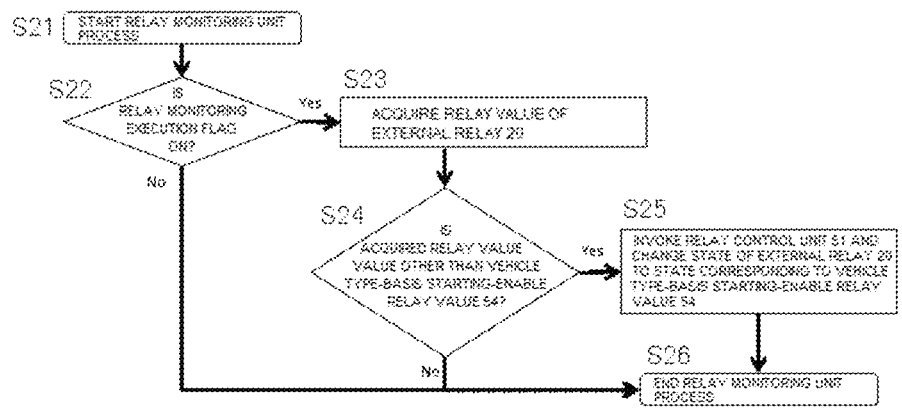
FIG. 11 is a flowchart of a relay monitoring unit.

The operation of each process units of the memory 13 will now be described with reference to the flowcharts in FIG. 10 to FIG. 12. First, the operation of the relay control unit 51 is described with reference to FIG. 10. When the relay control unit process is started in S11, first, in S12, the relay setting value 52 is overwritten with the given relay value. Next, in S13, the relay state is changed to the state of the relay setting value 52. Then, in S14, it is determined whether the relay value of the relay control command is identical with the vehicle type-basis starting-enable relay value 54. If Yes, the process proceeds to S15 to turn on the relay monitoring execution flag 56, and then proceeds to S16. If No in the determination in S14, the process proceeds to S16 to invoke the communication unit and notify the server 3 that the relay state change is completed. Subsequently, in S17, the relay control unit process ends. The relay control unit 51 is invoked in S25 of the relay monitoring unit 55 in FIG. 11 described later and in S36 of the engine-associated control unit 57 in FIG. 12 described later to start processing.

The operation of the relay monitoring unit is now described with reference to FIG. 11. When the relay monitoring unit process is started in S21, first, in S22, it is determined whether the relay monitoring execution flag 56 is on. As described above, the relay monitoring execution flag 56 is a flag for determining whether to execute monitoring of the external relay 20 and is set on in the initial state (at the time of shipment of the vehicle) or when the last relay control command from the server 3 is to change to the starting-enabled state. If the determination in S22 is Yes, the process proceeds to S23 and, after the relay state of the external relay 20 is acquired, proceeds to S24. On the other hand, if the determination in S22 is No, the process proceeds to S26 to terminate the relay monitoring unit process. In S24, it is determined whether the relay value acquired in S23 is a value other than the vehicle type-basis starting-enable relay value 54. If Yes, the process proceeds to S25 to invoke the relay control unit 51. After the relay setting value 52 is overwritten with the vehicle type-basis starting-enable relay value 54 corresponding to the starting-enabled state, the state of the external relay 20 is changed to the state corresponding to the vehicle type-basis starting-enable relay value 54. After that, the process proceeds to S26 to terminate the relay monitoring process. On the other hand, if No in the determination in S24, the process proceeds to S26 to terminate the relay monitoring process.

The operation of the relay monitoring unit is periodically performed, for example, every 30 seconds in the normal mode, every hour in the power saving mode. With this operation of the relay monitoring unit, in the supposed-to-be starting-enabled state (when the relay monitoring flag is on), the external relay 20 can be controlled such that the vehicle always enters the starting-enabled state, even when the memory 13 is rewritten with a numerical value different from the original numerical value due to a malfunction of firmware of the vehicle-mounted device. This control can prevent the vehicle from unintentionally entering the starting-disabled state and disturbing legitimate use of the vehicle. For example, even when the value of the relay setting value 52 in the memory 13 is rewritten with an unintended value due to a malfunction of firmware of the vehicle-mounted device, the external relay 20 is controlled such that the vehicle always enters the starting-enabled state when the relay monitoring execution flag is on, thereby keeping the vehicle in the starting-enabled state.

The operation of the engine-associated control unit 57 is now described with reference to FIG. 12. When the engine-associated control unit process is started in S31, the process proceeds to S32 to receive a relay control command through the communication unit 50. The process then proceeds to S33 to determine whether the present engine state is off. If the determination in S33 is Yes, the process proceeds to S34. In S34, it is determined whether the difference between the present time and the engine stop time is equal to or longer than the relay change-prohibited period 58 (X minutes). If the determination in S33 is No and the determination in S34 is No, the process proceeds to S35 to invoke the communication unit 50 and notify the server 3 that the relay control command is ignored. Subsequently, the process proceeds to S41 and the process of the engine-associated control unit ends. If the determination in S34 is Yes, the process proceeds to S36 to invoke the relay control unit 51 and change the state of the external relay 20 to the state corresponding to the relay control command. The process then proceeds to S37. In S37, the process waits for the engine state reevaluation period 60 (Y seconds) and then proceeds to S38. In S38, it is determined whether the executed relay control command is to change to the starting-disabled state and the present engine state is on. If the determination in S38 is Yes, the process proceeds to S39. In S39, the relay control unit 51 is invoked, and the state of the external relay 20 is changed to the state corresponding to the vehicle type-basis starting-enable relay value 54. Subsequently, the process proceeds to S40. In S40, the communication unit 50 is invoked, and the server 3 is notified that the relay control command is ignored. The process then proceeds to S41 and the process of the engine-associated control unit ends. On the other hand, if the determination in S38 is No, the process goes on to S41 and the process of the engine-associated control unit ends.

The operation of the engine-associated control unit 57 is performed periodically, for example, every 30 seconds in the normal mode and every hour in the power saving mode. In S35 and S40, the communication unit 50 is invoked and the server 3 is notified that the relay control command is ignored. The server 3, which receives the notification that the relay control command has been ignored, repeatedly transmits a relay control command until a notification of the relay state change completion is given in S16 in FIG. 10. This operation of the engine-associated control unit 57 can prevent the vehicle from entering the starting-disabled state in a dangerous place or in a place where the vehicle obstructs people, considering safety of the vehicle, when the vehicle is to be changed to the starting-disabled state under an instruction from the server. With the relay change-prohibited period 58 (X minutes, for example, two minutes) taken into consideration, it is possible to prevent the vehicle from improperly switching to the starting-disabled state even when the power of the vehicle is turned on again immediately after the power of the vehicle is turned off. In addition, with the engine state reevaluation period 60 (Y seconds, for example, five seconds) taken into consideration, the relay control command is not employed (the relay control command is ignored) when the vehicle-mounted device 1 receives a relay control command corresponding to the starting-disabled state immediately after the power of the vehicle is turned on (within Y seconds), thereby preventing the problem of switching to the starting-disabled state when the power of the vehicle is on.

Second Embodiment

In the first embodiment described above, an embodiment of the vehicle remote control system is applied to an internal combustion engine vehicle and makes a switch to the starting-disabled state by cutting off the engine starting control line (ST line) of the internal combustion engine using the external relay. In the following, an embodiment of the vehicle remote control system is described with reference to FIG. 13, which is applied to a vehicle using power other than an internal combustion engine vehicle, for example, an electric vehicle (hereinafter referred to as "EV") or a hybrid electric vehicle (hereinafter referred to as "HEV") and includes control other than the ST line control to make a switch to the starting-disabled state. Similar configuration to that in FIG. 1 to FIG. 12 is denoted by the same reference signs and a description thereof is omitted.

FIG. 13 illustrates a control method for the starting-disabled state. In FIG. 13, the kinds of vehicles are classified into internal combustion engine vehicle, EV, parallel HEV, series HEV, and series-parallel HEV, also classified according to whether an immobilizer is equipped, and further classified into a key type and a push type according to the starting method. FIG. 13 then illustrates which of three methods: method A, method B, and method C can be applied as the control method for the starting-disabled state. As the three control methods, the method A is cutting the ST line, the method B is disabling key authentication, and the method C is invalidating the push button.

The key type and the push type are classification according to the operation method for starting the power. The key type refers to the method in which a key is inserted into the key cylinder to start the power and switch between OFF, ACC, IGN, and START. The push type refers to the method for the smart key type, in which the power-starting push button is pushed to turn on the power.

The HEV is defined as follows. The parallel system is a system that drives wheels with a motor and an engine and charges a battery using the motor. The series system is a system that drives an electric generator with an engine for charging and drives wheels with a motor. The series-parallel system is a system that drives wheels with a motor and an engine and drives an electric generator with the engine for charging to drive the motor.

Here, the configuration of the vehicle-mounted device 1 for either an EV or an HEV has many parts common to those for an internal combustion engine vehicle illustrated in FIG. 6 but differs from the configuration for an internal combustion engine vehicle in that the EV does not include an internal combustion engine and the HEV has a mode of running with the motor alone. In the case of the EV, it is desirable to provide means for detecting that the push button is pushed and the power is on, instead of the IGN input detecting unit 17, and the external relay 20 may be replaced by electronic means, as will be described later. In the case of the HEV, it is desirable to provide means for detecting that the power is on, instead of the IGN input detecting unit 17, and the external relay 20 may be replaced by electronic means, as will be described later.

The three control methods, namely, the method A, the method B, and the method C will be described in detail below. The wiring for inserting the external relay 20 varies depending on the method, but in any of the methods, starting the power is impossible in the starting-disabled state, and starting the power is possible in the starting-enabled state.

The method A is the method described in the first embodiment. In this method, the engine starting control line (ST line) of the internal combustion engine is cut off using the external relay 20 to make a switch to the starting-disabled state and can be applied to the internal combustion engine vehicle. In the method A, the external relay 20 is inserted to the ST line, and power supply to the starter motor is interrupted by opening the external relay 20 in the starting-disabled state, thereby preventing the starting of the engine.

The method B is a method employed by a vehicle equipped with an immobilizer. An immobilizer is a device that allows the engine to start only when authentication is successful. More specifically, a unique ID code is recorded in an IC chip called a transponder embedded in a key, and the ID code of the transponder is authenticated by the ID code registered in the electronic control device of the vehicle body. In the method B, the external relay 20 is inserted to the signal line for the ID code on the transponder side received by the vehicle from the transponder in the immobilizer or the signal line for the ID code on the vehicle side in the immobilizer, and the external relay 20 is open in the starting-disabled state, so that authentication of the ID code has failed, and therefore the engine is unable to be started in the starting-disabled state. Here, the external relay 20 is used to set the starting-disabled state. However, any means may be used as long as the authentication of the ID code has failed in the starting-disabled state, and, for example, electronic means may be used. When electronic means is used, it is also desirable that whether the state is the starting-disabled state or the starting-enabled state can be detected by the relay input/output unit 18 (see FIG. 6).

The method C is a method applied to a vehicle with a power-starting push button in a case of the smart key type. A smart key-type vehicle does not have a key cylinder for starting the power and starts the power by notifying the electronic control device that the push button is pushed. For example, a key-type EV does not exist and all EVs are of the push type. In the method C, the external relay 20 is inserted to the wiring for the push button, and the external relay 20 is open in the starting-disabled state, so that the power is not turned on by operating the push button in the starting-disabled state. Here, an example in which the external relay 20 is used to set the starting-disabled state has been described. However, any means may be used that prevents the electronic control device from being notified that the push button is pushed in the starting-disabled state. For example, electronic means may be used. When electronic means is used, it is also desirable that whether the state is the starting-disabled state or the starting-enabled state can be detected by the relay input/output unit 18 (see FIG. 6).

In the case equipped with an immobilizer and of the key type, the method A or the method B is applicable for internal combustion engine vehicles, no EV is applicable, and the method B is applicable for all of parallel HEVs, series HEVs, and series-parallel HEVs.

In the case equipped with an immobilizer and of the push type, the method A, the method B, or the method C is applicable for internal combustion engine vehicles, the method B or the method C is applicable for EVs, the method B or the method C is applicable for all of parallel HEVs, series HEVs, and series-parallel HEVs.

In the case not equipped with an immobilizer and of the key type, the method A is applicable for internal combustion engine vehicles, no EV is applicable, and no methods support parallel HEVs, series HEVs, and series-parallel HEVs.

In the case not equipped with an immobilizer and of the push type, the method A or the method C is applicable for internal combustion engine vehicles, the method C is applicable for EVs, and the method C is applicable for parallel HEVs, series HEVs, and series-parallel HEVs.

The invention claimed is:

1. A server comprising:
a non-transitory computer readable medium configured to store instructions thereon; and a processor connected to the non-transitory computer readable medium, wherein the processor is configured to execute the instructions to:
- receive data related to use of a vehicle from a vehicle-mounted sensor mounted to the vehicle;
- receive operation information on the vehicle of a user acquired by the vehicle-mounted sensor;
- classify the user into one of a plurality of categories, in accordance with at least one of a type of the users' business, a kind of the vehicle or a usage mode of the vehicle;
- predict future income information for the user, based on the operation information for each category;
- compute credit information on the user based on the operation information;
- add rank information to the credit information about a credit limit to the user, based on the future income information for each category; and
- grant at least one of a lease or a loan to the user based on the added rank information.

2. The server according to claim 1, wherein the processor is configured to predict at least one of an income prediction value of the user, a deviation value of the user or a ranking of the income prediction value, as the future income information.

3. The server according to claim 1, wherein when the category corresponds to a taxi, the processor is configured to:
- calculate at least one of a travel time or a distance traveled in an occupied state and on a way to pick up, based on the operation information; and
- predict the future income information based on at least one of the travel time or the distance.

4. The server according to claim 1, wherein when the category corresponds to a truck of transportation, the processor is configured to:
- calculate at least one of a distance with cargo loaded or a loading ratio of the cargo, based on the operation information; and
- predict the future income information based on at least one of the distance with cargo loaded or the loading ratio of the cargo.

5. The server according to claim 1, wherein when the category corresponds to a construction machine, the processor is configured to:
- calculate a period of time in which the vehicle is used for a predetermined work, based on the operation information; and
- predict the future income information based on the period of time.

6. The server according to claim 5, wherein the processor is configured to:
- predict an expense by calculating a fuel consumption of the vehicle using at least one of hour meter information, IGN input information, engine start button information or fuel indicator information on the vehicle; and
- predict the future income information based on the expense.

7. The server according to claim 1, wherein when the category corresponds to a vehicle for commute, the processor is configured to:
- determine whether the vehicle is used for commuting; and
- predict the future income information based on the determination regarding whether the vehicle is used for commuting.

8. The server according to 1, wherein when the category corresponds to a vehicle for business use, the processor is configured to:
- determine a status of business activities; and
- predict the future income information based on the determined status.

9. The server according to claim 1, wherein the processor is configured to predict the future income information using an artificial intelligence (AI) trained based on the operation information and the future income information.

10. The server according to claim 1, wherein the processor is configured to output at least one of the rank information or the future income information of the user to a financial system.

11. A server comprising:
a non-transitory computer readable medium configured to store instructions thereon; and
a processor connected to the non-transitory computer readable medium, wherein the processor is configured to communicate with a financial system, and the processor is configured to execute the instructions to:
- receive data related to use of a vehicle from a vehicle-mounted sensor mounted to the vehicle;
- receive operation information on the vehicle of a user acquired by the vehicle-mounted device;
- classify the user into one of a plurality of categories, in accordance with at least one of a type of the users' business, a kind of the vehicle or a usage mode of the vehicle;
- predict future income information for the user, based on the operation information for each category;
- compute credit information on the user based on the operation information;
- add rank information to the credit information about a credit limit to the user, based on the future income information for each category; and
- output at least one of the rank information or the future income information of the user to the financial system; and
- instruct a transmitter to transmit a request to the financial system to grant at least one of a lease or loan to the user based on at least one of the added rank information or the future income information of the user; and
- receive a grant decision from the financial system for granting the at least one of the lease or the loan.

12. The server according to claim 11, wherein the processor is configured to predict at least one of an income prediction value of the user, a deviation value of the user or a ranking of the income prediction value, as the future income information.

13. The server according to claim 11, wherein when the category corresponds to a taxi, the processor is configured to:
- calculate at least one of a travel time or a distance traveled in an occupied state and on a way to pick up, based on the operation information; and
- predict the future income information based on at least one of the travel time or the distance.

14. The server according to claim 11, wherein when the category corresponds to a truck of transportation, the processor is configured to:
- calculate at least one of a distance with cargo loaded or a loading ratio of the cargo, based on the operation information; and predict the future income information based on at least one of the distance with cargo loaded or the loading ratio of the cargo.

15. The server according to claim 11, wherein when the category corresponds to a construction machine, the processor is configured to:
    calculate a period of time in which the vehicle is used for a predetermined work, based on the operation information; and
    predict the future income information based on the period of time.

16. The server according to claim 15, wherein the processor is configured to:
    predict an expense by calculating a fuel consumption of the vehicle using at least one of hour meter information, IGN input information, engine start button information or fuel indicator information on the vehicle; and
    predict the future income information based on the expense.

17. The server according to claim 11, wherein when the category corresponds to a vehicle for commute, the processor is configured to:
    determine whether the vehicle is used for commuting; and
    predict the future income information based on the determination regarding whether the vehicle is used for commuting.

18. The server according to 11, wherein when the category corresponds to a vehicle for business use, the processor is configured to:
    determine a status of business activities; and
    predict the future income information based on the determined status.

19. The server according to claim 11, wherein the processor is configured to predict the future income information using an artificial intelligence (AI) trained based on the operation information and the future income information.

20. The server according to claim 11, wherein the processor is configured to output at least one of the rank information or the future income information of the user to the financial system.

* * * * *